(12) United States Patent
Jeffrey et al.

(10) Patent No.: US 12,263,399 B2
(45) Date of Patent: Apr. 1, 2025

(54) OPTICAL USER INPUT DEVICE

(71) Applicant: Ironburg Inventions Limited, Loughborough (GB)

(72) Inventors: Carl Jeffrey, Cheltenham (GB); Nick Tanner, Bristol (GB)

( * ) Notice: Subject to any disclaimer, the term of this patent is extended or adjusted under 35 U.S.C. 154(b) by 213 days.

(21) Appl. No.: 18/046,989

(22) Filed: Oct. 17, 2022

(65) Prior Publication Data

US 2024/0123336 A1    Apr. 18, 2024

(51) Int. Cl.
*A63F 13/24* (2014.01)
*A63F 13/213* (2014.01)
*A63F 13/44* (2014.01)

(52) U.S. Cl.
CPC .......... *A63F 13/24* (2014.09); *A63F 13/213* (2014.09); *A63F 13/44* (2014.09)

(58) Field of Classification Search
None
See application file for complete search history.

(56) References Cited

U.S. PATENT DOCUMENTS

| | | | |
|---|---|---|---|
| 3,639,705 A * | 2/1972 | Rayner | H01H 25/00 200/17 R |
| 4,032,728 A | 6/1977 | Oelsch | |
| 4,786,768 A | 11/1988 | Langewis et al. | |
| 4,868,530 A * | 9/1989 | Ahs | G05G 5/05 335/207 |
| 5,430,262 A | 7/1995 | Matsui et al. | |
| 5,451,053 A | 9/1995 | Garrido | |
| 5,773,769 A | 6/1998 | Raymond | |
| 5,841,372 A | 11/1998 | Matsumoto | |
| 5,874,906 A | 2/1999 | Willner et al. | |
| 5,883,690 A | 3/1999 | Meyers et al. | |
| 5,969,520 A * | 10/1999 | Schottler | G05G 9/047 324/207.2 |
| 5,989,123 A | 11/1999 | Tosaki et al. | |
| 6,203,432 B1 | 3/2001 | Roberts et al. | |

(Continued)

*Primary Examiner* — Seng H Lim
(74) *Attorney, Agent, or Firm* — Walters & Wasylyna LLC

(57) ABSTRACT

The invention provides an input apparatus, a games controller for a games console and an analogue control stick. The analogue control stick comprises a shaft pivotally mounted for movement about at least two orthogonal axes and a target surface disposed at a proximal end of the shaft. The analogue control stick comprises at least one light source and a sensor, for capturing images of the target surface illuminated by the light source at a polling interval. A processing unit compares a current image of the target surface with the immediately preceding image of the target surface captured by the sensor to determine magnitude and direction of any incremental movement of the target surface relative to the sensor between capturing the compared images. The processing unit accumulates data, in a memory cache, indicative of the incremental movements to calculate an absolute position of the target surface relative to a predefined or origin position. The analogue control stick comprises an origin position detection system for determining return of the target surface to a predefined origin position. The processing unit is configured to clear the cache of accumulated incremental movement data upon detection of the target surface being disposed at the predefined origin position.

20 Claims, 13 Drawing Sheets

(56) References Cited

U.S. PATENT DOCUMENTS

| | | |
|---|---|---|
| 6,251,015 B1 | 6/2001 | Caprai |
| 6,512,511 B2 | 1/2003 | Willner et al. |
| 6,710,766 B1 | 3/2004 | Ogata |
| 6,752,719 B2 | 6/2004 | Himoto et al. |
| 6,760,013 B2 | 7/2004 | Willner et al. |
| 6,853,308 B1 | 2/2005 | Dustin |
| 7,510,477 B2 | 3/2009 | Argentar |
| 7,758,424 B2 | 7/2010 | Riggs et al. |
| 7,859,514 B1 | 12/2010 | Park |
| 7,993,203 B1 | 8/2011 | Walker, II et al. |
| 8,063,881 B2 * | 11/2011 | Wright ............... G06F 3/0338 345/157 |
| D667,892 S | 9/2012 | Burgess et al. |
| 8,480,491 B2 | 7/2013 | Burgess et al. |
| 8,641,525 B2 | 2/2014 | Burgess et al. |
| 8,777,620 B1 | 7/2014 | Baxter |
| D721,139 S | 1/2015 | Burgess et al. |
| D728,030 S | 4/2015 | Burgess et al. |
| D730,451 S | 5/2015 | Burgess et al. |
| D733,802 S | 7/2015 | Burgess et al. |
| 9,089,770 B2 | 7/2015 | Burgess et al. |
| D748,734 S | 2/2016 | Burgess et al. |
| 9,289,688 B2 | 3/2016 | Burgess et al. |
| 9,308,450 B2 | 4/2016 | Burgess et al. |
| 9,308,451 B2 | 4/2016 | Burgess et al. |
| 9,352,229 B2 | 5/2016 | Burgess et al. |
| 9,492,744 B2 | 11/2016 | Burgess et al. |
| D777,260 S | 1/2017 | Burgess et al. |
| 9,533,219 B2 | 1/2017 | Burgess et al. |
| 9,550,116 B2 | 1/2017 | Burgess et al. |
| D780,180 S | 2/2017 | Ironmonger et al. |
| D780,759 S | 3/2017 | Ironmonger et al. |
| D780,760 S | 3/2017 | Ironmonger et al. |
| 9,707,479 B2 | 7/2017 | Burgess et al. |
| D794,027 S | 8/2017 | Ironmonger et al. |
| 9,804,691 B1 | 10/2017 | Strahle et al. |
| 9,878,238 B2 | 1/2018 | Burgess et al. |
| 10,029,175 B2 | 7/2018 | Burgess et al. |
| 10,188,940 B2 | 1/2019 | Burgess et al. |
| 10,220,308 B2 | 3/2019 | Ironmonger et al. |
| 10,258,877 B2 | 4/2019 | Burgess et al. |
| 10,279,250 B2 | 5/2019 | Burgess et al. |
| 10,286,305 B2 | 5/2019 | Burgess et al. |
| 10,350,490 B2 | 7/2019 | Ironmonger et al. |
| 10,427,036 B2 | 10/2019 | Burgess et al. |
| 10,441,881 B2 | 10/2019 | Burgess et al. |
| 10,576,386 B2 | 3/2020 | Ironmonger et al. |
| 10,596,453 B2 | 3/2020 | Burgess et al. |
| 10,596,455 B2 | 3/2020 | Burgess et al. |
| D881,125 S | 4/2020 | Ironmonger et al. |
| D881,282 S | 4/2020 | Ironmonger et al. |
| D881,283 S | 4/2020 | Ironmonger et al. |
| D889,549 S | 7/2020 | Ironmonger et al. |
| D889,550 S | 7/2020 | Ironmonger et al. |
| 10,843,069 B2 * | 11/2020 | Ironmonger ............ G06F 3/0202 |
| 10,857,454 B2 | 12/2020 | Burgess et al. |
| 10,870,051 B2 | 12/2020 | Burgess et al. |
| 10,940,386 B2 | 3/2021 | Ironmonger et al. |
| 10,967,252 B2 | 4/2021 | Ironmonger et al. |
| 11,013,986 B2 | 5/2021 | Ironmonger et al. |
| 11,110,345 B2 | 9/2021 | Burgess et al. |
| 11,185,766 B2 | 11/2021 | Burgess et al. |
| 11,278,797 B2 | 3/2022 | Burgess et al. |
| 11,385,672 B1 * | 7/2022 | Chu ..................... G05G 25/00 |
| 11,969,646 B1 * | 4/2024 | Ranta ..................... A63F 13/24 |
| 2001/0003713 A1 | 6/2001 | Willner et al. |
| 2001/0025778 A1 | 10/2001 | Ono |
| 2002/0052237 A1 | 5/2002 | Magill |
| 2002/0128064 A1 | 9/2002 | Sobota |
| 2003/0067111 A1 | 4/2003 | Swan |
| 2004/0259059 A1 | 12/2004 | Aoki |
| 2005/0083297 A1 | 4/2005 | Duncan |
| 2005/0215321 A1 | 9/2005 | Hussaini et al. |
| 2005/0230230 A1 | 10/2005 | Ueshima et al. |
| 2005/0277470 A1 | 12/2005 | Watanachote |
| 2006/0025217 A1 | 2/2006 | Hussaini et al. |
| 2006/0116204 A1 | 6/2006 | Chen et al. |
| 2007/0126700 A1 * | 6/2007 | Wright ............... G06F 3/0321 345/161 |
| 2007/0262959 A1 * | 11/2007 | Gu ..................... G05G 9/047 345/161 |
| 2007/0281787 A1 | 12/2007 | Numata et al. |
| 2008/0018600 A1 * | 1/2008 | Hou ..................... G06F 3/0338 345/161 |
| 2008/0188306 A1 | 8/2008 | Tetterington et al. |
| 2008/0225002 A1 * | 9/2008 | Weppenaar ........... G06F 3/0338 345/161 |
| 2008/0261695 A1 | 10/2008 | Coe |
| 2009/0054146 A1 | 2/2009 | Epstein |
| 2009/0088250 A1 | 4/2009 | Carlson |
| 2009/0225028 A1 * | 9/2009 | Abrams ................ G06F 3/0481 345/161 |
| 2009/0258705 A1 | 10/2009 | Guinchard |
| 2010/0073283 A1 | 3/2010 | Enright |
| 2010/0167825 A1 | 7/2010 | Sternberg et al. |
| 2010/0265176 A1 * | 10/2010 | Olsson ..................... G06F 3/016 345/161 |
| 2010/0267454 A1 | 10/2010 | Navid |
| 2010/0304865 A1 | 12/2010 | Picunko |
| 2011/0065510 A1 | 3/2011 | Borrel |
| 2011/0105231 A1 | 5/2011 | Ambinder et al. |
| 2011/0148667 A1 * | 6/2011 | Yeh ........................ G05G 9/047 341/20 |
| 2011/0256930 A1 | 10/2011 | Jaouen |
| 2011/0281649 A1 | 11/2011 | Jaouen |
| 2012/0085582 A1 | 4/2012 | Wu et al. |
| 2012/0142418 A1 | 6/2012 | Muramatsu |
| 2012/0142419 A1 | 6/2012 | Muramatsu |
| 2012/0172128 A1 | 7/2012 | Atzom |
| 2012/0260220 A1 | 10/2012 | Griffin |
| 2012/0299244 A1 | 11/2012 | Rice et al. |
| 2012/0322553 A1 | 12/2012 | Burgess et al. |
| 2012/0322555 A1 | 12/2012 | Burgess et al. |
| 2013/0029763 A1 | 1/2013 | Zhou |
| 2013/0147610 A1 | 6/2013 | Grant et al. |
| 2013/0150155 A1 | 6/2013 | Barney et al. |
| 2013/0196770 A1 | 8/2013 | Barney et al. |
| 2014/0274397 A1 | 9/2014 | Sebastian |
| 2015/0194279 A1 | 7/2015 | Rubio |
| 2015/0234479 A1 | 8/2015 | Schantz et al. |
| 2015/0238855 A1 | 8/2015 | Uy et al. |
| 2015/0279580 A1 * | 10/2015 | Okazaki ............. G05G 9/04796 200/4 |
| 2015/0255918 A1 | 11/2015 | Riggs et al. |
| 2015/0321093 A1 | 11/2015 | Burgess et al. |
| 2015/0360126 A1 | 12/2015 | Burgess et al. |
| 2016/0030837 A1 * | 2/2016 | Lin ..................... A63F 13/213 463/38 |
| 2016/0082349 A1 | 3/2016 | Burgess et al. |
| 2016/0193529 A1 | 7/2016 | Burgess et al. |
| 2016/0334830 A1 * | 11/2016 | Sirohiwala ............ G01D 5/145 |
| 2016/0346682 A1 | 12/2016 | Burgess et al. |
| 2016/0361636 A1 | 12/2016 | Gassoway et al. |
| 2017/0001106 A1 * | 1/2017 | Gassoway ............. G05G 9/047 |
| 2017/0001107 A1 | 1/2017 | Burgess et al. |
| 2017/0001108 A1 | 1/2017 | Burgess et al. |
| 2017/0087456 A1 | 3/2017 | Burgess et al. |
| 2017/0151494 A1 | 6/2017 | Ironmonger et al. |
| 2017/0157509 A1 | 6/2017 | Burgess et al. |
| 2017/0322585 A1 * | 11/2017 | Tomita ............... G05B 19/4184 |
| 2019/0176033 A1 * | 6/2019 | Ironmonger ............. A63F 13/24 |
| 2021/0308565 A1 * | 10/2021 | Li ............................ A63F 13/24 |
| 2022/0008821 A1 * | 1/2022 | Khim ....................... A63F 13/24 |
| 2022/0091626 A1 * | 3/2022 | Nøstvold ................ G02B 27/30 |
| 2022/0357761 A1 * | 11/2022 | Lu ............................ G05G 9/047 |
| 2023/0221751 A1 * | 7/2023 | Morrison ................ G01D 5/145 345/161 |
| 2024/0060797 A1 * | 2/2024 | Takamori ............. G06F 3/0338 |
| 2024/0231414 A1 * | 7/2024 | Takamori ............. H01H 25/04 |

* cited by examiner

OPTICAL USER INPUT DEVICE

FIELD

The present invention relates to an optical user input device for a computer, such as, but not limited to, a games console and to a method of calibration of the device, and more particularly, but not exclusively the invention relates to, an analogue control stick or optical thumbstick for a game controller or game pad.

BACKGROUND

In a computer system a graphical or visual environment is presented to a user on a display monitor. The user can interact with the computer system to perform functions or execute commands via a user manipulable device or input apparatus such as a game pad. The user can interact with the computer system to operate a graphical user interface, play a game, manipulate files and perform other functions. The user receives visual and/or audio feedback from the computer system.

It is known to provide controllers for games consoles which are generally intended to be held and operated by the user using both hands. A conventional controller will generally comprise a hard outer case with a plurality of controls mounted about the controller. Typically, the controls include buttons, analogue control sticks, bumpers and triggers. The analogue control sticks are typically intended to be operated by the thumb of the user and are also known as thumbsticks.

It is known to provide thumbsticks with at least one potentiometer, typically two potentiometers for X and Y axis motion control. A typical potentiometer is a variable resistor with a wiper arm which slides across the electrical contact in order to change its electrical resistance. Such potentiometers are susceptible to the wear and tear caused by the friction between the wiper arm and the contact when the potentiometer shaft is rotated. It is desirable to provide an analogue input device which does not require such potentiometers.

It is a further object of the present invention to provide a user manipulable device or input device for a computer which is configured to self-locate or self-center; that is to say, the user manipulable device comprises an actuator which returns to a predefined or neutral position when released by the user.

The present invention seeks to overcome or at least mitigate the problems of the prior art.

SUMMARY

A first aspect of the present disclosure provides an analogue control for an input apparatus. The analogue control comprises a shaft pivotally mounted for movement about at least two orthogonal axes and a target surface disposed at a proximal end of the shaft. The analogue control comprises at least one light source and a sensor, for capturing images of the target surface illuminated by the light source at a polling interval. A processing unit compares a current image of the target surface with the immediately preceding image of the target surface captured by the sensor to determine magnitude and direction of any incremental movement of the target surface relative to the sensor between capturing the compared images. The processing unit accumulates data, in a memory cache, indicative of the incremental movements to calculate an absolute position of the target surface relative to a predefined or origin position. The analogue control may comprise an origin position detection system for determining placement, or return, of the target surface in, or to, a predefined origin position. The processing unit is configured to clear the cache of accumulated incremental movement data upon detection of the target surface being disposed at the predefined origin position.

Optionally, the origin position detection system is configured to determine the orientation of the target surface relative to the sensor and compare with the orientation of the target surface relative to the sensor when disposed in the predefined origin position.

Optionally, the origin position detection system comprises a captured reference image of the target surface disposed in the predefined origin position and wherein the processing unit compares, using digital image correlation, the captured reference image with a current image of the target surface.

Optionally, the origin position detection system comprises a predefined pattern provided upon the target surface.

Optionally, the pattern comprises contrasting features to define one or more reference points which are readily detected by the sensor.

Optionally, the pattern comprises a rotational symmetry about the longitudinal axis of the shaft.

Optionally, the order of the rotational symmetry is infinite.

Optionally, the origin position detection system comprises an electrical sensor for detecting an electrical characteristic indicative of the target surface being disposed the predefined origin position.

Optionally, the origin position detection system comprises a pair of electrical contacts and a conductor arranged to connect the pair of electrical contacts when the target surface is disposed in the predefined origin position.

Optionally, the electrical characteristic is the resistance of an element in an electric circuit.

Optionally, the electrical characteristic is the voltage of an element in an electric circuit.

Optionally, the electrical characteristic is the current flowing through an element in an electric circuit.

Optionally, the electrical characteristic is a magnetic field and the electrical sensor is a magnetic sensor.

Optionally, the input apparatus is a game controller for a games console.

Optionally, the at least two orthogonal axes comprises two axes both of which are arranged normal to a longitudinal axis of the shaft.

Optionally, the light source is a light emitting diode. Optionally, the light source is a laser.

Optionally, the sensor is an image sensor. Optionally, the image sensor is a photodetector selected from the following group: a photodiode array, a CMOS sensor, and a CCD image sensor.

Optionally, the processing unit employs digital image correlation to compare two images of the target surface.

Optionally, the shaft is biased to return to the predefined origin position and wherein in the predefined origin position the shaft is in a neutral unbiased condition.

Optionally, the shaft comprises a ball at the proximal end, the ball providing the target surface and being mounted in a receiver, the receiver comprises an internal wall shaped complementary to the ball, the receiver comprising an opening through which the shaft extends, the opening being flared to define a cup and wherein the shaft comprise a cone slideable mounted thereon, the cone being resiliently biased towards the cup.

Optionally, the receiver comprises a first component and a second component mounted thereto, the first component providing at least a portion of a first hemispherical internal wall, the second component providing at least a portion of a second generally opposing hemispherical internal wall.

Optionally, the first component is a lower receiver portion and the second component is an upper receiver portion.

Optionally, the ball and receiver are keyed to limit rotation to two orthogonal axes both of which are arranged normal to a longitudinal axis of the shaft, one of the ball and receiver comprising at least one key and the other one of the ball and receiver comprising a keyseat.

Optionally, the key takes the form of cylindrical lug and the keyseat takes the form of a channel in which the key is received.

Optionally, the analogue control comprises a frame having a switch contact arranged to be engageable with a switch and a flexure or hinge so that a portion of the frame is displaceable sufficient to activate the switch.

Optionally, in the predefined origin position a longitudinal axis of the shaft is perpendicular to two of the at least two orthogonal axes about which the shaft is pivotally moveable.

Optionally, in the predefined origin position the target surface is centered in its available range of motion.

Optionally, in the predefined origin position the shaft is centered in its available range of motion.

Optionally, an end stop surrounds the shaft and defines the range of motion of the shaft.

Optionally, the end stop is circular.

A second aspect of the present disclosure provides a method of tracking movement of an analogue control stick of an input device or game controller, the method comprising:

illuminating a target surface of the analogue control stick with light;

capturing images of the target surface with an image sensor at a predefined polling interval;

comparing, using digital image correlation, a current image of the target surface with the immediately preceding image of the target surface captured by the sensor to determine magnitude and direction of an incremental movement of the target surface between the compared images;

accumulating data, in a memory cache, indicative of the incremental movements to calculate an absolute position of the target surface relative to a predefined origin position.

The method may comprises determining the magnitude and direction of displacement of the target surface from the predefined origin position from the accumulated data indicative of the incremental movements of the target surface.

The method may comprise:

detecting return of the target surface to the predefined origin position, wherein upon detection of the target surface returning to the predefined origin position the method comprises clearing or deleting the stored accumulated incremental movement data.

Optionally, detecting return of the target surface to the predefined origin position comprises comparing, using digital image correlation, a current image of the target surface with a reference image of the target surface captured by the sensor when the target surface was in a predefined, origin or reference position.

Optionally, the target surface may comprise a predefined pattern having contrasting features defining one or more reference points and comparing the current image of the target surface with the reference image comprises matching said one or more reference points.

Optionally, the target surface may comprise a predefined pattern having contrasting features defining one or more reference points and comparing the current image of the target surface with the reference image comprises correlation of said one or more reference points of each of the images with each other.

Optionally, detecting return of the target surface to the predefined origin position may comprise detecting an electrical characteristic indicative of the target surface being disposed the predefined or origin position.

Optionally, detecting an electrical characteristic comprises measuring the resistance of an element in an electric circuit.

Optionally, detecting an electrical characteristic comprises measuring the voltage across an element in an electric circuit.

Optionally, detecting an electrical characteristic comprises measuring the current flowing through an element in an electric circuit.

Optionally, detecting an electrical characteristic comprises sensing completion of an electric circuit.

Optionally, detecting an electrical characteristic comprises sensing a magnetic field having a magnitude above a threshold value.

A third aspect of the present disclosure provides an input apparatus comprising an analogue control stick. The analogue control stick comprises a shaft pivotally mounted for movement about at least two orthogonal axes and a target surface disposed at a proximal end of the shaft. The analogue control stick comprises at least one light source and a sensor, for capturing images of the target surface illuminated by the light source at a polling interval. A processing unit compares a current image of the target surface with the immediately preceding image of the target surface captured by the sensor to determine magnitude and direction of any incremental movement of the target surface relative to the sensor between capturing the compared images. The processing unit accumulates data, in a memory cache, indicative of the incremental movements to calculate an absolute position of the target surface relative to a predefined or origin position. The analogue control stick may comprise an origin position detection system for determining return of the target surface to a predefined origin position. The processing unit is configured to clear the cache of accumulated incremental movement data upon detection of the target surface being disposed at the predefined origin position.

A fourth aspect of the present disclosure provides a games controller for a games console comprising an analogue control stick. The analogue control stick comprises a shaft pivotally mounted for movement about at least two orthogonal axes and a target surface disposed at a proximal end of the shaft. The analogue control stick comprises at least one light source and a sensor, for capturing images of the target surface illuminated by the light source at a polling interval. A processing unit compares a current image of the target surface with the immediately preceding image of the target surface captured by the sensor to determine magnitude and direction of any incremental movement of the target surface relative to the sensor between capturing the compared images. The processing unit accumulates data, in a memory cache, indicative of the incremental movements to calculate an absolute position of the target surface relative to a predefined or origin position. The analogue control stick may comprise an origin position detection system for determining return of the target surface to a predefined origin position. The processing unit is configured to clear the cache of accumulated incremental movement data upon detection of the target surface being disposed at the predefined origin position.

Optionally, the games controller is a game pad comprising an outer case having a front face, a top face and opposing side walls, the games controller comprising at least one control located on the top face of the games controller, the games controller being shaped to be held in both hands of a user such and the user's index fingers are positioned to operate the at least one control located on the top of the games controller.

A fifth aspect of the present disclosure provides an analogue control for an input apparatus, the analogue control comprising: a shaft pivotally mounted for movement about at least two orthogonal axes; a target surface disposed at a proximal end of the shaft; at least one light source; and a sensor, for capturing images, at a polling interval, of the target surface illuminated by the light source. The analogue control comprises a processing unit, the processing unit configured to compare a current image of the target surface with the immediately preceding image of the target surface captured by the sensor to determine magnitude and direction of any incremental movement of the target surface relative to the sensor between the compared images. The processing unit accumulates data, in a memory cache, indicative of the incremental movements to calculate an absolute position of the target surface relative to a predefined or origin position.

Within the scope of this application, it is envisaged or intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements extracted from said one embodiment may be included in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

Further features and advantages of the present invention will be apparent from the specific embodiments illustrated in the drawings and discussed below.

BRIEF DESCRIPTION OF THE DRAWINGS

Exemplary embodiments of the invention will now be described with reference to the accompanying drawings, in which.

DETAILED DESCRIPTION

Detailed descriptions of specific embodiments of a system, input devices, controllers, and methods are disclosed herein. It will be understood that the disclosed embodiments are merely examples of the way in which certain aspects of the disclosed adapter can be implemented and do not represent an exhaustive list of all of the ways the adapter may be embodied. As used herein, the word "exemplary" is used expansively to refer to embodiments that serve as illustrations, specimens, models, or patterns. Indeed, it will be understood that the system, input devices, controllers, and methods described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1A:
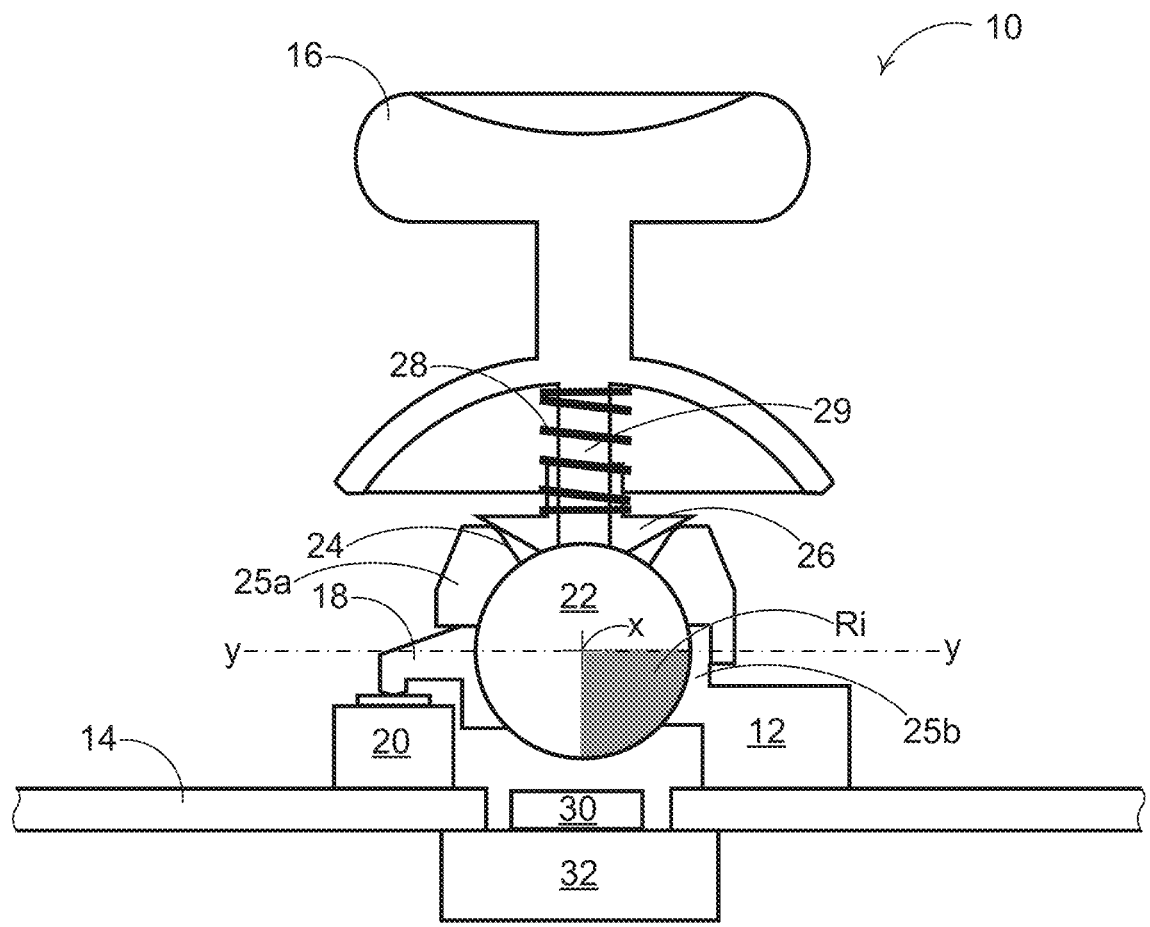
FIG. 1A shows an input device for a game controller according to an embodiment of the present disclosure.

Referring to FIG. 1A there is shown a component 10 of a game controller input apparatus for a use with a computer. The input apparatus 1110, best shown in FIGS. 10 to 12, takes the form of a game pad for use with a video games console, personal computer, laptop computer, mobile device, cloud gaming system, or similar. In other embodiments, the input apparatus 1110 may take the form of a handheld games console or other mobile device such as but not limited to a smartphone, tablet computer, phablet or the input apparatus may be, or may be incorporated into, an accessory device (such as, but not limited to, a sleeve or case) for use with such a mobile device.

The component 10 takes the form of an analogue control stick, also referred to herein as a thumbstick. The thumbstick 10 comprises a frame or base 12 mounted to a circuit board 14, chassis or housing of the input apparatus 1110 and an actuator 16 moveably mounted to the base 12. The actuator 16 comprises a ball or target surface 22, the target surface 22 may take the form of at least a portion of a sphere at a lower end of a shaft 29. The ball 22 may be mounted in a receiver 25a/25b, the receiver 25a/25b defining an internal wall or surface having a generally spherical shaped complementary to the ball 22 such that the ball 22 is rotatable about at least an x and y axis. The receiver 25a/25b comprises an opening through which the shaft 29 passes or extends.

The frame or base 12 comprises a limb 18 configured to activate a switch 20. The base 12 may comprise a flexible region such as but not limited to a living hinge, the flexible region is resiliently based to a neutral or rest position in which the switch is deactivated. Force applied to the actuator 16 in a generally downward direction (i.e., towards the circuit board 14) displaces the limb 18 so as to engage the switch 20 and activate the switch 20. When the downward force is released the base returns to the rest position and the switch is released or deactivated.

The component 10 comprises a biasing or centering mechanism for returning the actuator 16 back to a neutral, rest position. In the illustrated embodiment, the biasing mechanism returns the actuator 16 to a central position within its range of motion. The biasing mechanism may comprise a cup 24 and cone 26 received therein. The cup 24 is provided by the opening in the receiver 25a/25b and is tapered or flared so to define an internal wall having a conical shape. The cone 26 is slidably mounted on the shaft 29 of the actuator 16. A spring 28 or other suitable resilient biasing device is mounted on the shaft 29 to encourage or bias the cone 26 into the cup 24. Absent any external forces, for example from a user, the spring 28 forces the cone 26 into the cup 24 and has the effect of locating the actuator centrally within the range of motion of the actuator 16. The cup 24 may also serve to limit or define the range of motion of the actuator 16. The cup 24 may define a circular end stop limiting travel of the actuator 16 in the plane comprising the x and y axes.

The component 10 comprises a sensor 30 mounted generally below the ball 22, in the illustrated embodiment the sensor is in vertical alignment with the ball 22 and shaft 29 (when in the neutral position), in other embodiments the sensor 30 may be located off center.

The sensor 30 may take the form of an optoelectronic sensor (such as low-resolution video camera) of the type used in other computer peripherals such as mice and trackerballs. The sensor 30 is employed to capture successive images of the surface of the ball 22. An image processor 32 is coupled to or in communication with the sensor 30.

The sensor 30 tracks movement of the ball 22 and hence movement of the actuator 16 can be employed as a pointing device, or a human interface device for input of spatial or movement data to a computer or games console. This enables the user to effect movement of an object or objects displayed on graphical user interface by moving the actuator 16. Movement of the actuator 16 is reflected on a visual interface, such as a monitor or screen by movements of a graphical icon such as a pointer, cursor, reticle or graticule or by other changes to the displayed visual image.

The sensor 30 provides input data for the processor 32 which employs digital image correlation. The sensor 30 may capture an image of the ball 22. In an embodiment, the sensor 30 may capture an image of the naturally occurring texture in the material of the ball 22. The surface of the ball 22, when lit at a grazing angle by a light emitting diode or other suitable light source, casts distinct shadows. Images of the surface are captured in continuous succession at a polling interval; each captured image is compared to the previous image to determine the distance and direction of movement of the ball or target surface 22 between the current image and the previously captured image to generate incremental movement data.

In order to determine an absolute position of the actuator 16 and/or ball 22 the image processor 32 calculates the cumulative effect of all the captured images taken since the actuator 16 and/or ball 22 was in a known or fixed position or location. This known or fixed position or location may be a neutral, rest, or center location of the actuator 16 within its available range of motion. A processing unit of image processor 32 calculates the cumulative effect of all the incremental changes in position of the target surface 22 or actuator 16. The processing unit may add each datum or data point indicative of incremental movements of the actuator 16 and/or ball 22 to a cache or memory, which may be part of image processor 32 or a cache or memory located elsewhere. The sum of the incremental position data provides the absolute position of the target surface 22 or actuator 16, that is to say the location of target surface 22 or actuator 16 within its available range of motion. In this way the processor 32 can determine the magnitude and direction of displacement of the actuator 16 about the x and y axes relative to the center or neutral position. This sum of the incremental position data can be translated into a movement or control of a feature displayed upon the screen, for example, but not limited to, using a Cartesian coordinate system.

The image processor 32 may calculate the magnitude and direction of rotation of the ball or target surface 22 about the x and y rotational axes, which information is translated into movement or position of the displayed visual image in x (horizontal) and y (vertical) axes on the screen or monitor in dependence on the software application being controlled. In some software applications, the magnitude and direction of displacement of the actuator 16 from the center or neutral position may represent a distance and direction of a cursor or graticule from a center is displaced from the center of the screen or a displayed background image. In other software applications the direction and magnitude of displacement of the actuator 16 from the center or neutral position may represent a direction of movement of the displayed visual image and the rate of change or speed with which the image is moved in that direction, for example, but not limited to, a first or small movement or rotation of the actuator about the y rotational axis may represent a slow or walking movement in a forward or backward direction of a character or object in game play, whereas a second or large (as compared to the first degree of movement) movement or rotation of the actuator about the y rotational axis may represent a faster or running movement in a forward or backward direction of a character in game play.

In order to reduce or limit the cumulative movement data that the image processor 32 must record or store, and/or to avoid or mitigate any hysteresis effects in the position of the thumbstick 10 comprises an origin position detection system. The image processor 32, or a storage device in communication therewith, stores a reference or calibration image of the ball or target surface 22 when in a neutral, origin, or center position. The image processor 32 compares each captured image with the reference image to determine if the actuator 16 is in the neutral or center position. If the image processor 32 determines the current captured images is sufficiently close to that of the reference image, then the processor 32 can take appropriate action depending upon the software application being controlled. For example, but not limited to, the image processor 32 may send a signal which causes the computer or game console to locate or move a cursor or graticule to a central position on the screen or displayed background image or it may cause the computer or game console to cease movement of the character or object. Additionally, or alternatively, the image processor 32 may clear the cache or store of captured images, or cumulative movement data of the actuator 16, stored since the last time the processor 32 determined the actuator 16 was in the neutral, origin, or center position. In some instances, the reference image may also be replaced with the current image of the ball or target surface 22 in the neutral or center position, for example, but not limited to, during a calibration sequence.

The origin reference image forms part of the origin position detection system which employs image correlation between the current image captured by the sensor 30 with the origin reference image to determine if the two images correlate. The system may be configured to determine if the images correlate within a threshold value or range. Upon determining that the actuator 16 is in the neutral or center position the origin position detection system clears, or deletes, a stored cache or memory store of positional information. The cache or memory store of positional information may comprise an accumulation of captured images of the target surface 22, this may include the most recent image capture, or alternative may include an accumulation of calculated data indicative of the incremental changes in position of the target surface 22 or actuator 16 between polling intervals of the sensor 30. It will be appreciated that clearing, emptying or deleting the stored cache or memory of positional information may not erase the data but may free used memory locations in the cache to be overwritten by new data indicative of the position of the actuator 16.

In order to facilitate the image correlation process, a pattern or image may be provided on a surface of the ball 22, the pattern or image may be printed or otherwise formed on the surface thereof. The pattern provided on the ball 22 may be advantageous in comparing the current image with the reference image. The pattern may mitigate or eliminate errors in the correlation process for example due to changes in the surface of the ball 22 that may occur for example, but not limited to accumulation of dust or other debris on the surface of the ball 22 or due to wear from movement of the ball 22 within the receiver.

Figure 1B:
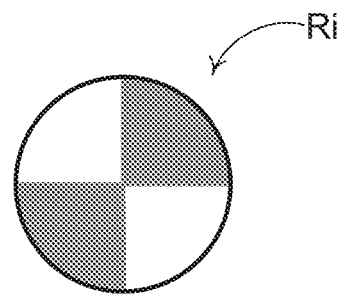
FIG. 1B shows component of the input device of FIG. 1A, generally from below, having a pattern provided thereon for image correlation.

FIG. 1A shows the actuator 16 in the neutral or center position, and FIG. 1B shows an image capture of an exemplary ball or target surface 22, when the actuator 16 is in the neutral or center position, and an exemplary pattern or image printed, formed or otherwise mounted to thereto.

Figure 2A:
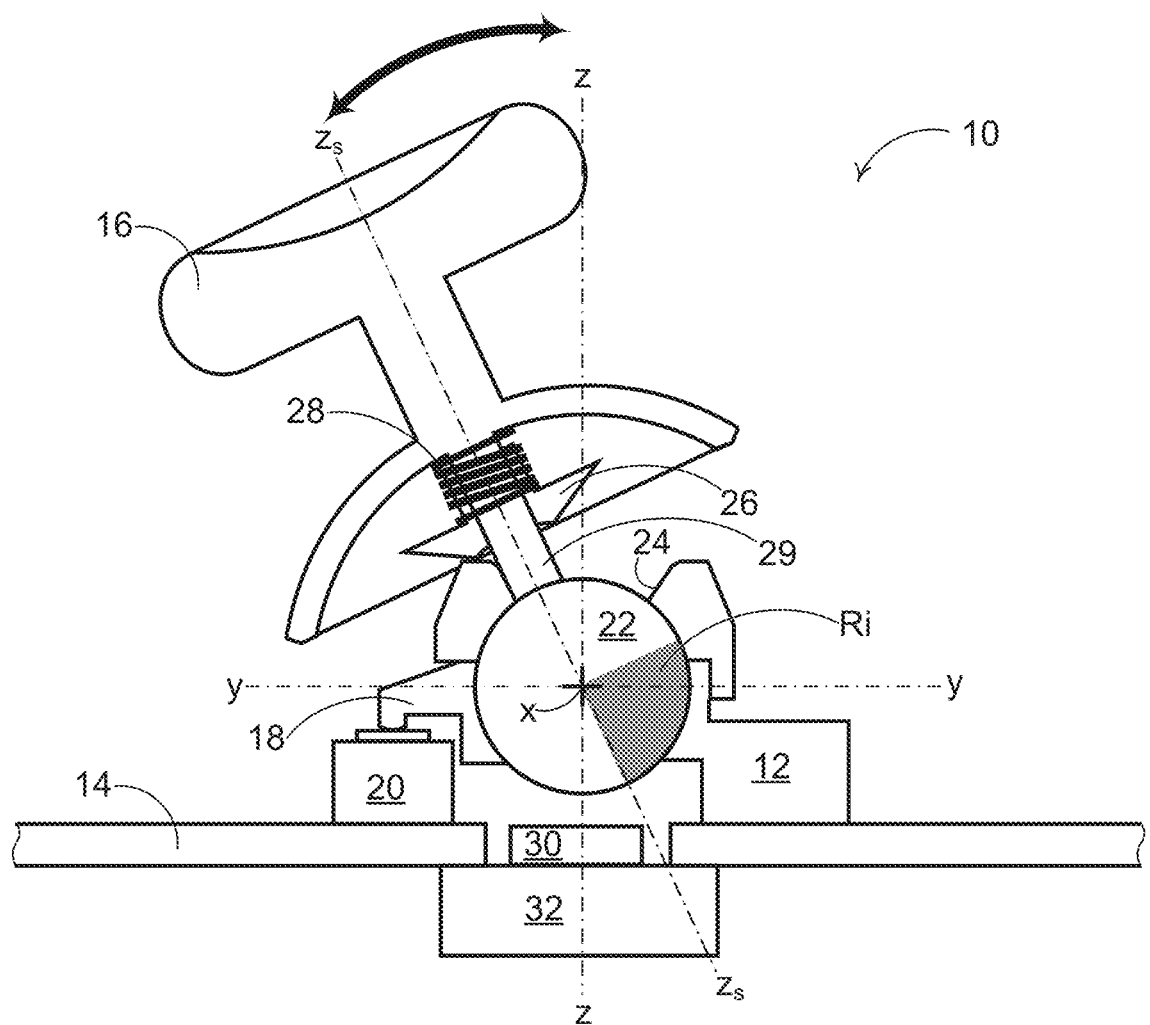
FIG. 2A shows the input device of FIG. 1A in which an actuator has been displaced from a rest or neutral position.
Figure 2B:
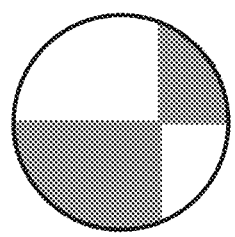
FIG. 2B shows an image of the base of the component of FIG. 1B in the displaced condition illustrated in FIG. 2A.

FIG. 2A shows the actuator 16 in the off axis or off-center position, and FIG. 2B shows an image capture of the ball or target surface 22, when the actuator 16 is in the off axis or off-center position of FIG. 2A, and FIG. 2B shows the displacement of the exemplary pattern or image provided on the ball or target surface 22.

Figure 3:
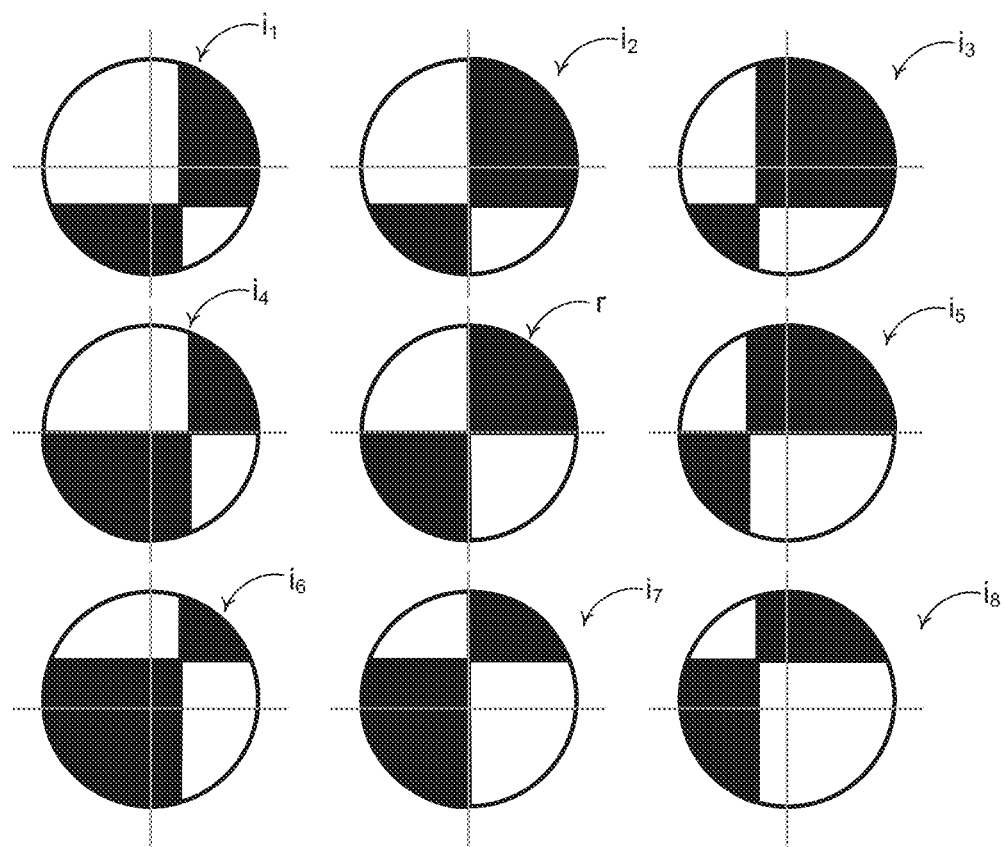
FIG. 3 shows an image of the base of the component of FIG. 1B in a variety of displaced conditions.

FIG. 3 shows a plurality of captured images of the ball or target surface 22. An image r is an image of the ball or target surface 22 when the actuator 16 is in the neutral or center position and may be stored as a reference image. The images i1 to i8 are various images of the ball or target surface 22 captured when the actuator 16 is off axis or off center to various degrees in different directions on the x and y axes.

Figure 13:
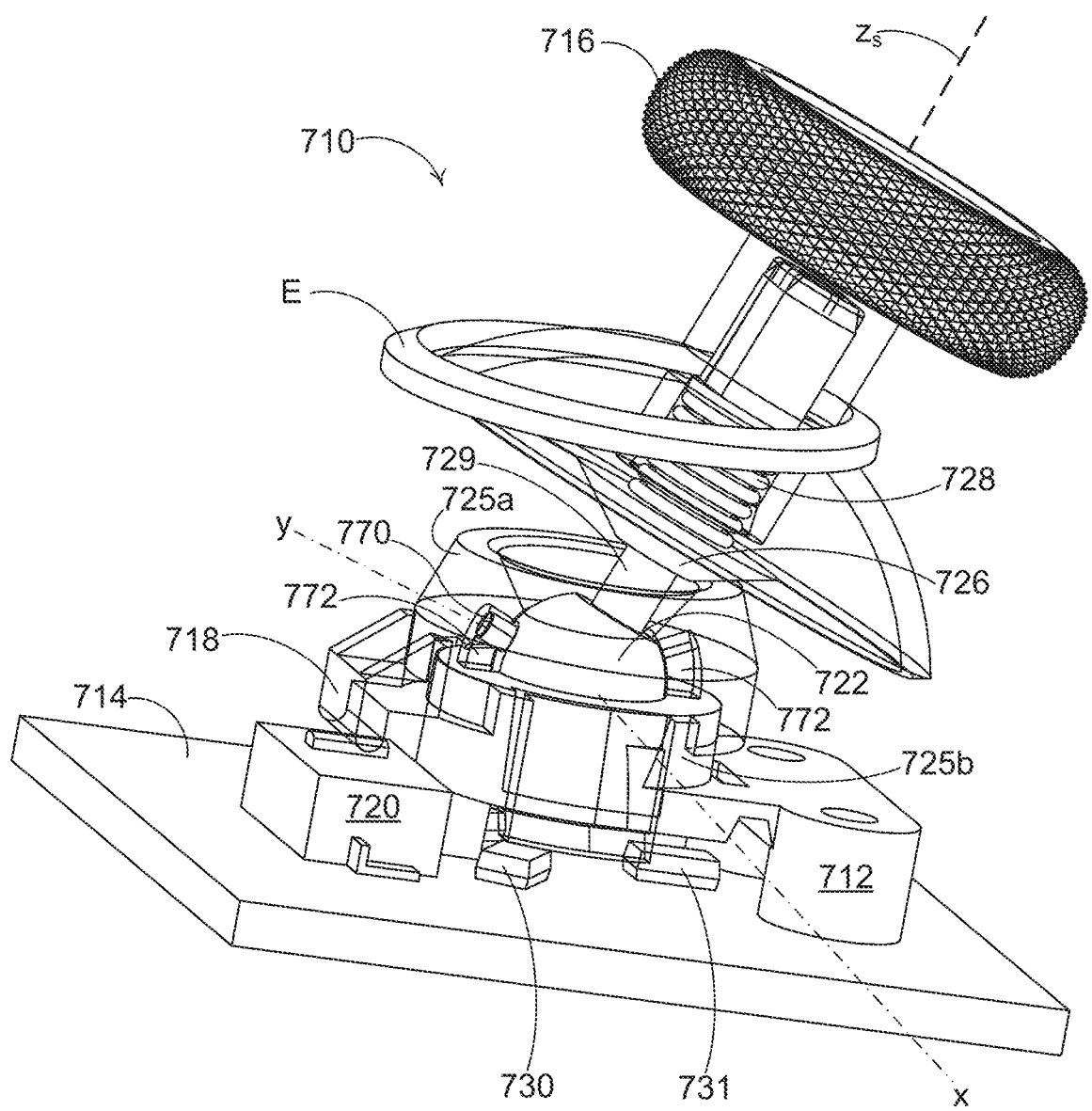
FIGS. 13 and 14 show an input device for a game controller according to another embodiment of the present disclosure.
Figure 14:
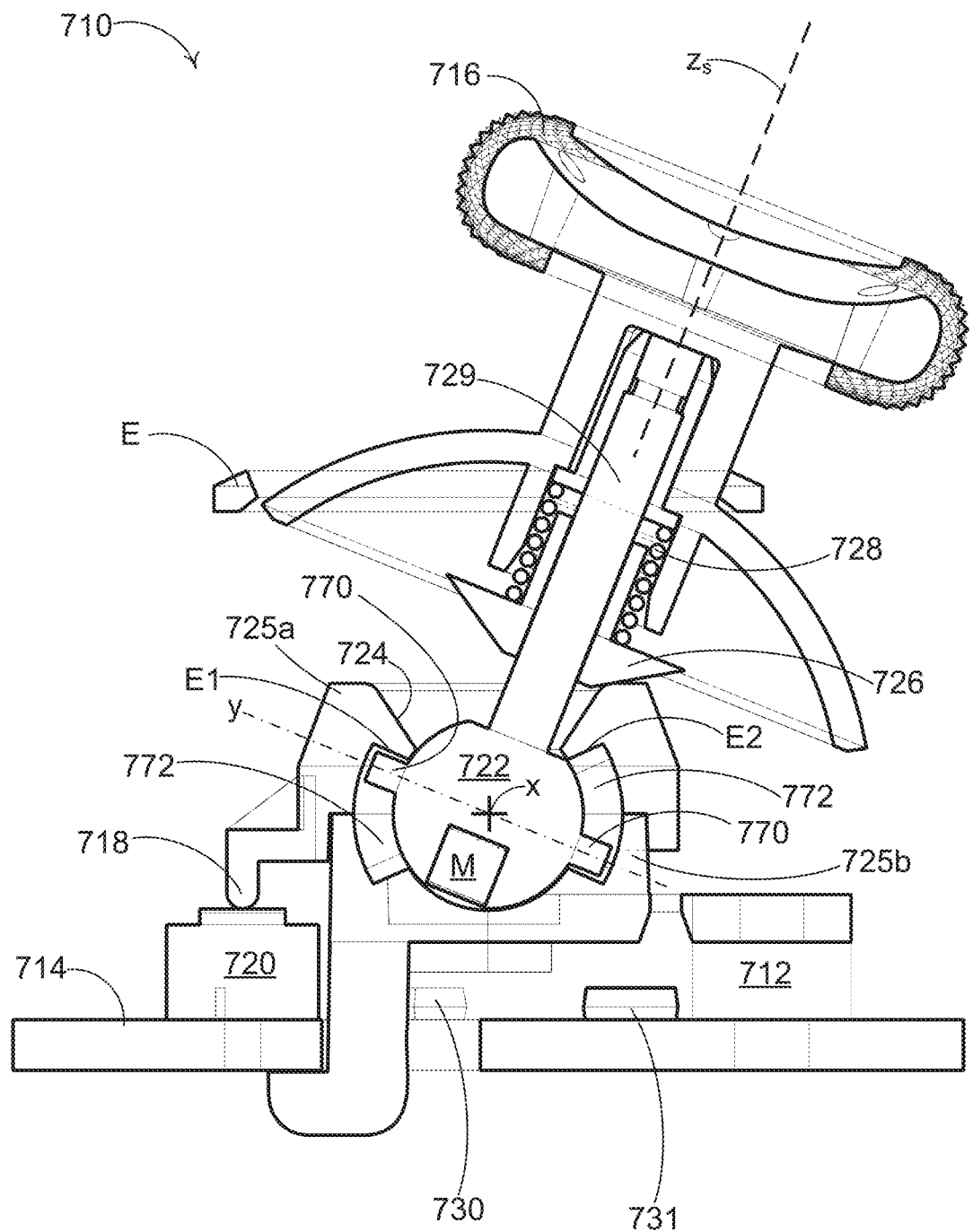

In some embodiments, the ball 22 may be keyed with respect to the receiver 25a and/or 25b to limit rotation to two axes, the x and y axes, that is to say rotation about the shaft axis zs, which in the rest position may be normal to the plane of the circuit board, is prevented or inhibited. FIGS. 13 and 14 show an embodiment in which rotation about the shaft axis zs is prevented or inhibited.

Figure 7A:
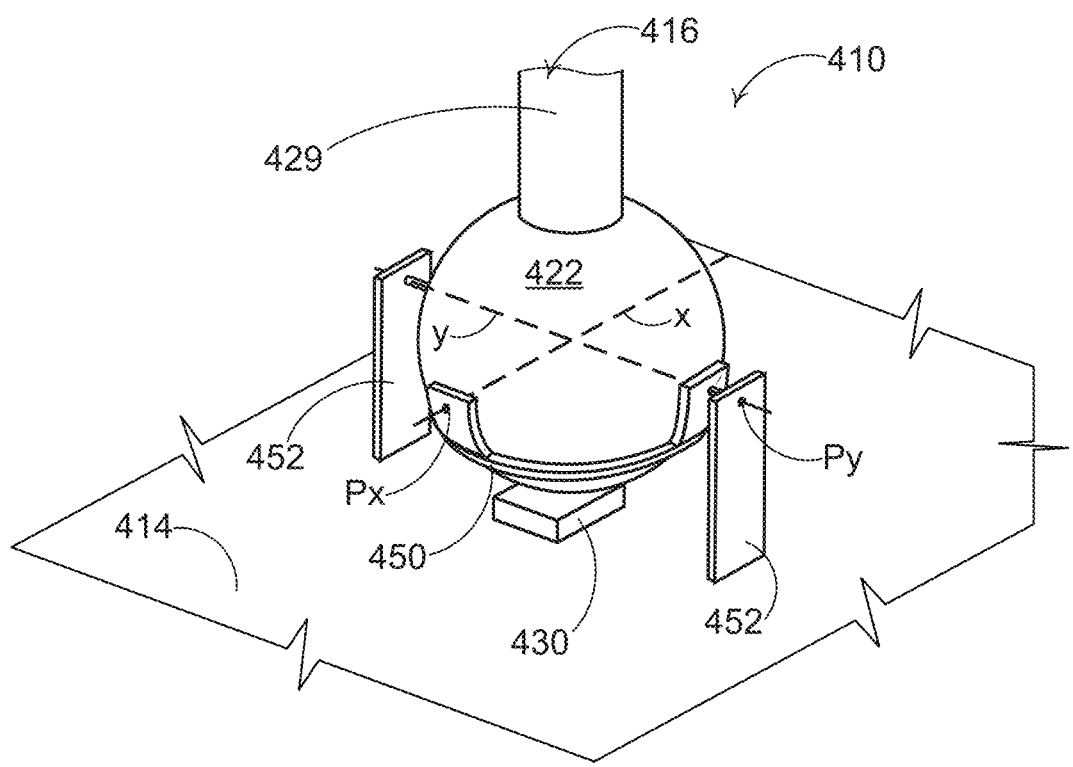
FIGS. 7A and 7B show input devices for a game controller according to still another embodiment of the present disclosure.
Figure 7B:
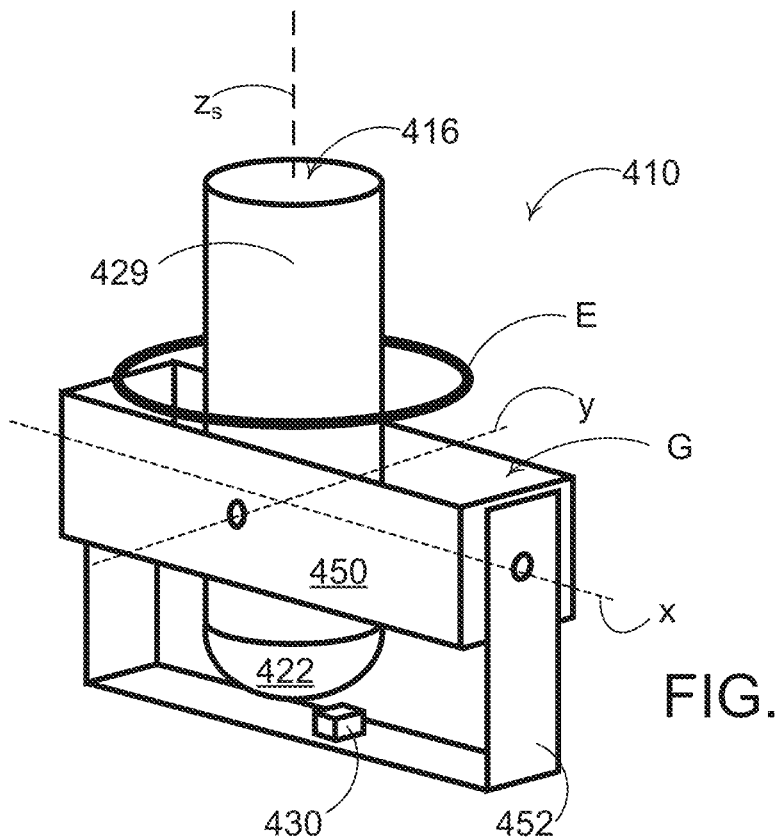

In other embodiments the ball 22 may be replaced with an alternative mechanism such as, but not limited to, two or more gimbals to provide rotation movement about two or more axes, such an embodiment is schematically illustrated in FIGS. 7A and 7B. In FIG. 7A a ball 422 is mounted in a first gimbal having an annular ring 450 through which a lower portion of the ball 422 passes to extend or project therefrom. The ball 422 is rotationally mounted about a pivot Px so as to be rotatable about a first axis x. The first gimbal is rotationally mounted about a second pivot Py to wall elements 452 so as to be rotatable about a second axis y. The ball 422 is mounted over a sensor 430 having the form of an optoelectronic sensor (such as low-resolution video camera) of the type used in other computer peripherals such as mice and trackerballs and monitors movement of ball 422.

In some embodiments, the actuator 416 may be mounted to the base by a combination of a one or more gimbals G, see FIG. 7B. In such embodiments, a portion of the actuator 416 may extend through or be visible through an opening or cutaway in the gimbal G to provide a target surface 422 which may take the form of a portion of a sphere, in other embodiments other shapes may be employed for the target surface 22. A sensor 430 may be mounted below the ball 422 to track movement thereof. The apparatus 410 of FIG. 7B may comprise an end stop E limiting or defining the range of motion of the actuator 416. The end stop E may take the form of circular opening in a housing or wall of the apparatus 410, disposed about the shaft 429 and centered on the axis zs of the shaft 429 when in in the rest position. The end stop E may take the form of circular protrusion surrounding the shaft 429 and mounted thereto.

Referring now to FIGS. 4A to 6, 8A to 9, 12 and 13 there is shown further alternative embodiments of the present disclosure. In the third, fourth, fifth, and sixth illustrated embodiments, like numerals have, where possible, been used to denote like parts, albeit with the addition of the prefix "100"; "200"; "300"; "500"; "700" to indicate that these features belong to the third, fourth, fifth, sixth, and seventh embodiment, respectively. The further alternative embodiments share many common features with the embodiments of FIGS. 1 to 3 and 7, therefore only the differences from the embodiment illustrated in FIGS. 1 to 4 will be described in any greater detail.

Figure 4A:
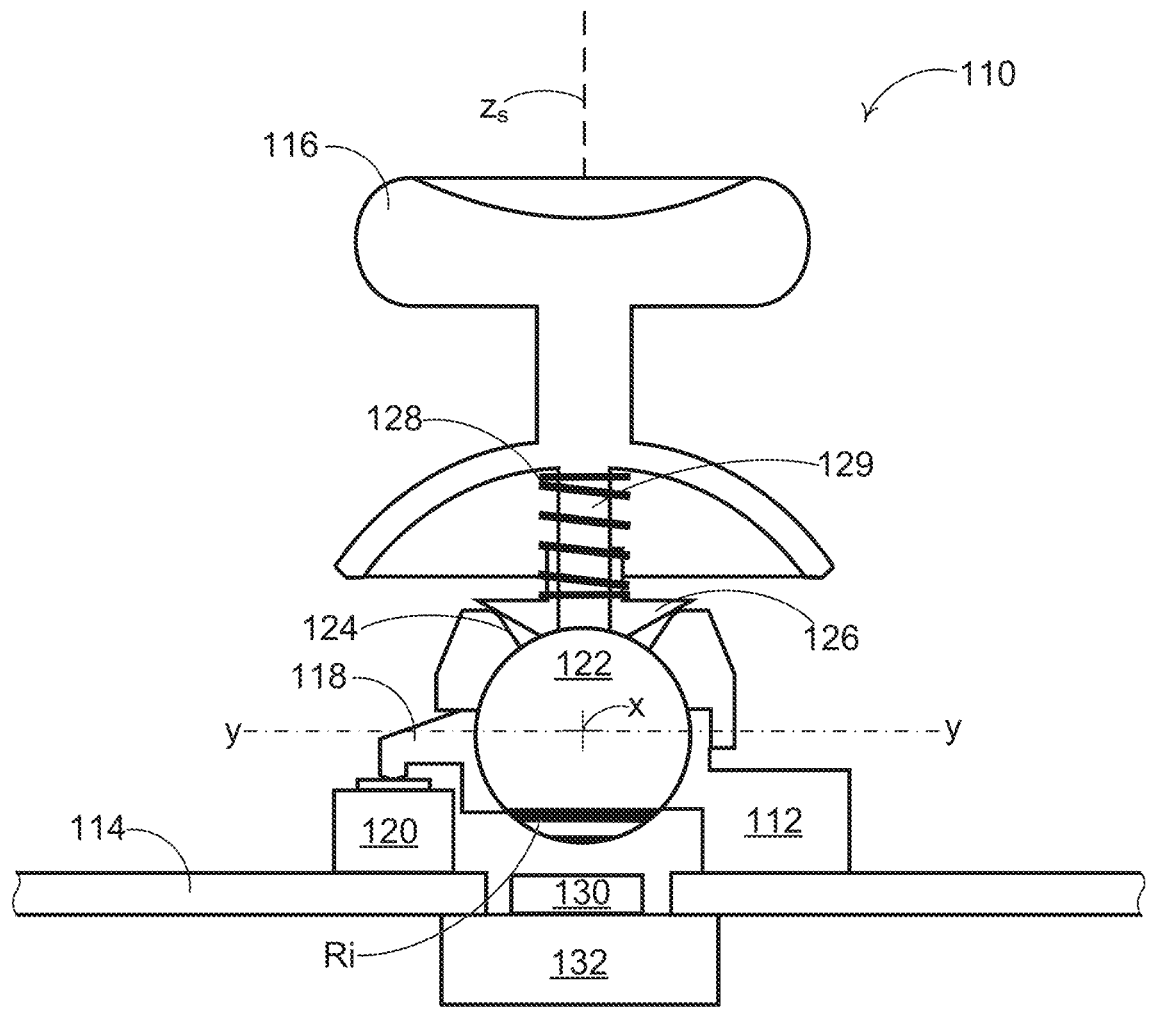
FIG. 4A shows an input device for a game controller according to another embodiment of the present disclosure.
Figure 4B:
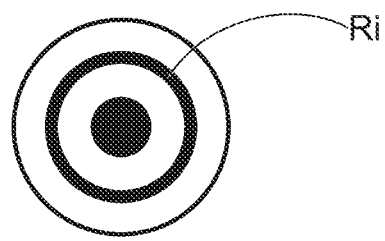
FIG. 4B shows component of the input device of FIG. 4A, generally from below, having a pattern provided thereon for image correlation.

The apparatus 110 of FIG. 4A is substantially similar in construction to the apparatus shown in FIG. 1A, albeit the pattern or image Ri may be provided on the surface of the ball 122, is different, the third illustrated embodiment the image Ri is rotationally symmetric, and comprises a circle centered on the base of the ball 122, best shown in FIG. 4B, and an annulus or ring concentrically arranged with the circle, in some embodiments one of the circle and ring may be omitted. Providing a rotationally symmetric image may be advantageous in that the image is independent of rotation of the ball 122 about the shaft axis zs, when determining if the actuator 116 is centered in the x and y directions or axes.

Figure 5:
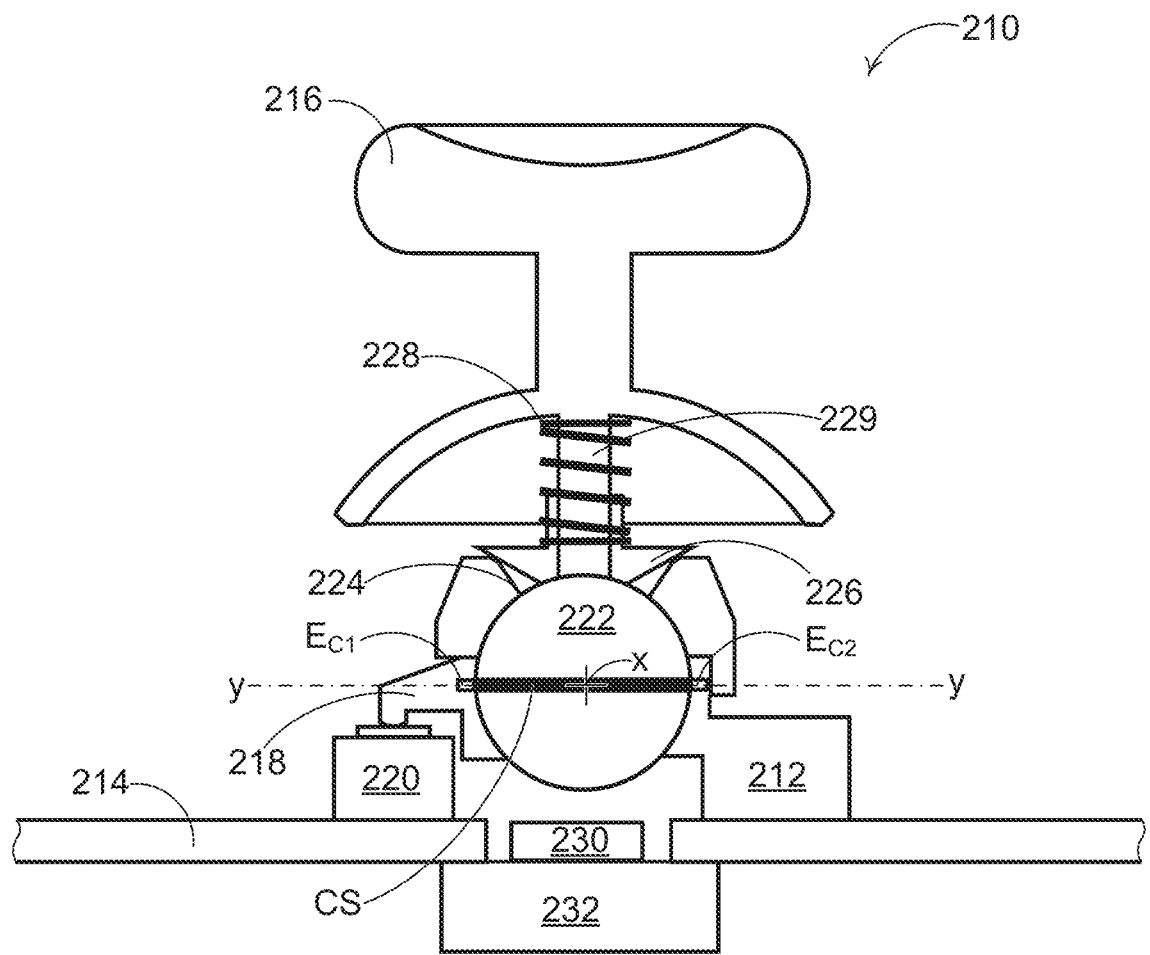
FIG. 5 shows an input device for a game controller according to another embodiment of the present disclosure having electrical contacts for detecting the actuator is centered or in a rest or neutral position.

The apparatus 210 of FIG. 5 is substantially similar in construction to the apparatus shown in FIGS. 1A and 4A, albeit the pattern or image Ri on the surface of the ball 22, 122 has been removed or omitted for convenience. The apparatus 210 of FIG. 5 comprises an alternative mechanism for determining if the actuator 216 is centered in the x and y directions or axes. At least one pair of electrical contacts EC1, EC2 is provided in or one the receiver in which the ball 222 is located. The ball 222 comprises a conductor CS. The conductor CS may be provided as a strip or band surrounding the ball 222 as shown in FIG. 5 or may be plate or disc separating an upper hemisphere of the ball 22 from a lower hemisphere. In still other embodiments the conductor CS may be provided as wire or rod passing through the ball 222. The conductor CS is arranged to complete an electrical circuit when the actuator 216 is centered, in this way a signal or electrical characteristic can be employed to detect the centering of the ball 222. In still other embodiments, the center detection mechanism may be optical instead of electrical, the electrical contacts EC1, EC2 may be replaced with an optical transmitter and receiver, the conductor CS may be replaced with an optical transmission medium, such as but not limited to an optical fiber or waveguide. The system when correctly aligned, centered, may detect an optical signal or transmission from the transmitter at the receiver.

Figure 6:
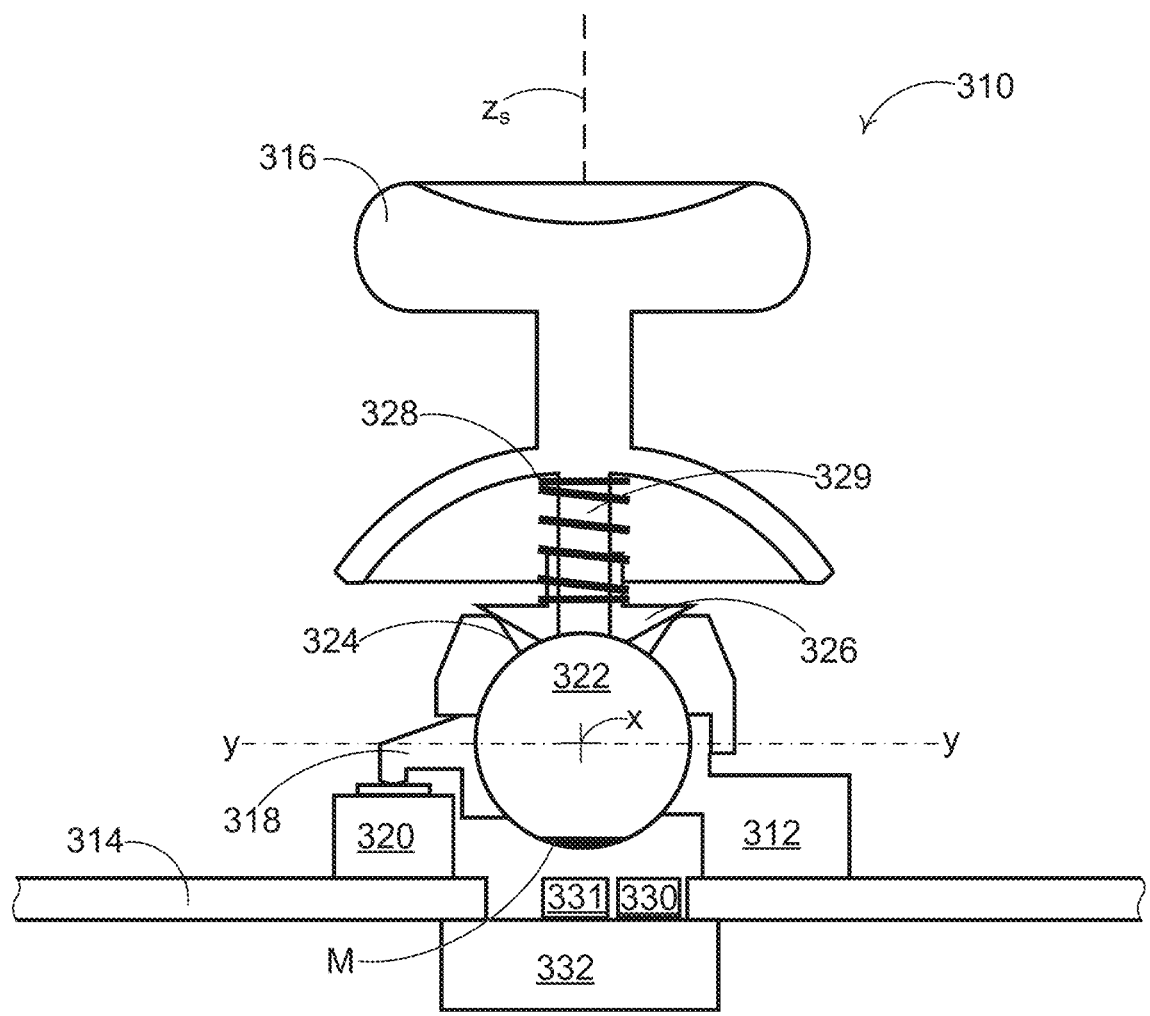
FIG. 6 shows an input device for a game controller according to another embodiment of the present disclosure having a magnetic sensor for detecting the actuator is centered or in a rest or neutral position.

The apparatus 310 of FIG. 6 is substantially similar in construction to the apparatus shown in FIGS. 1A and 4A, albeit the pattern or image Ri on the surface of the ball 22, 122 has been removed or omitted for convenience. The apparatus 310 of FIG. 6 comprises an alternative mechanism for determining if the actuator 316 is centered in the x and y directions or axes. The ball 322 comprises a magnet M in the form of a permanent magnet. A magnetic sensor 331, which may take the form of a Hall effect sensor, is mounted to the circuit board 314. When the magnetic sensor 331 detects the presence, or absence, of a predefined magnetic field the processor 332 determines that the actuator 316 is centered. For example, the processor 332 may be configured to determine the actuator 316 is centered when the magnetic sensor 331 detects a magnetic field above a predefined threshold value. The processor 332 may be configured with a calibration method, to set or define the threshold value when the actuator 316 is centered.

Figure 8A:
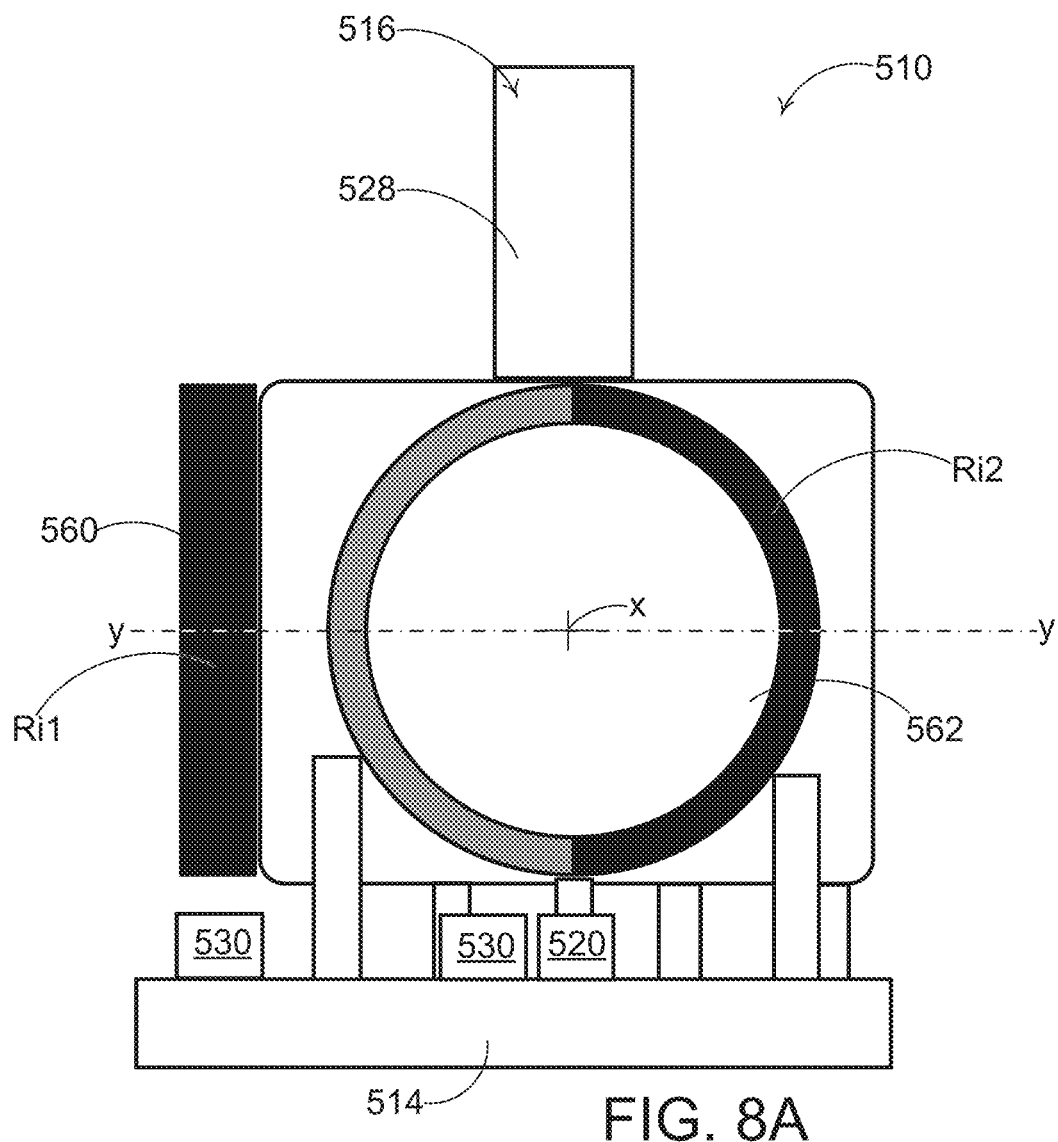
FIG. 8A shows an input device for a game controller according to yet another embodiment of the present disclosure.
Figure 8B:
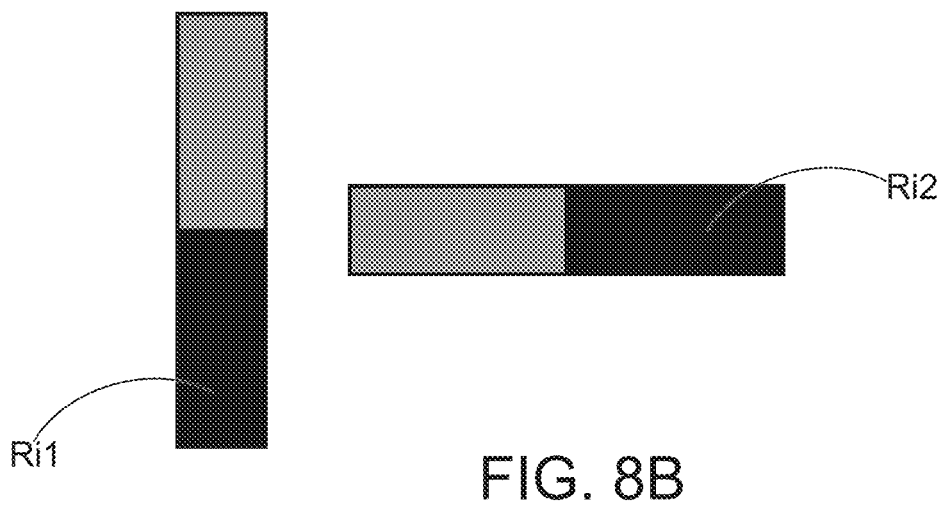
FIG. 8B shows a pair of components of the input device of FIG. 5A, generally from below, having a pattern provided thereon for image correlation.

FIG. 8A shows an apparatus 510 according to an alternative embodiment, is which an actuator is mounted to a circuit board 512 by a pair of gimbals (not shown) similar to that shown in FIGS. 7A and 7B. The apparatus 510 comprises a pair of wheels 560, 562 each of which is associated with one of the gimbals. Each wheel 560, 562 rotates about an axis in synchronicity with the rotational movement of the gimbal with which it is associated. The apparatus 510 comprises a sensor 530 in the form of an optoelectronic sensor (such as low-resolution video camera) of the type used in other computer peripherals such as mice and trackerballs for monitoring the movement of each of the pair of wheels 560, 562.

Each wheel 560, 562 comprises an image or pattern Ri1, Ri2 for facilitating recognition of the position of the wheel 560, 562. The image or pattern Ri1, Ri2 is employed to determine when the actuator 516 is centered in the available range of movement. A processor (not shown) can detect that the actuator 516 is centered when a captured image from both of the sensors 530 correlates with a respective reference image.

Figure 9:
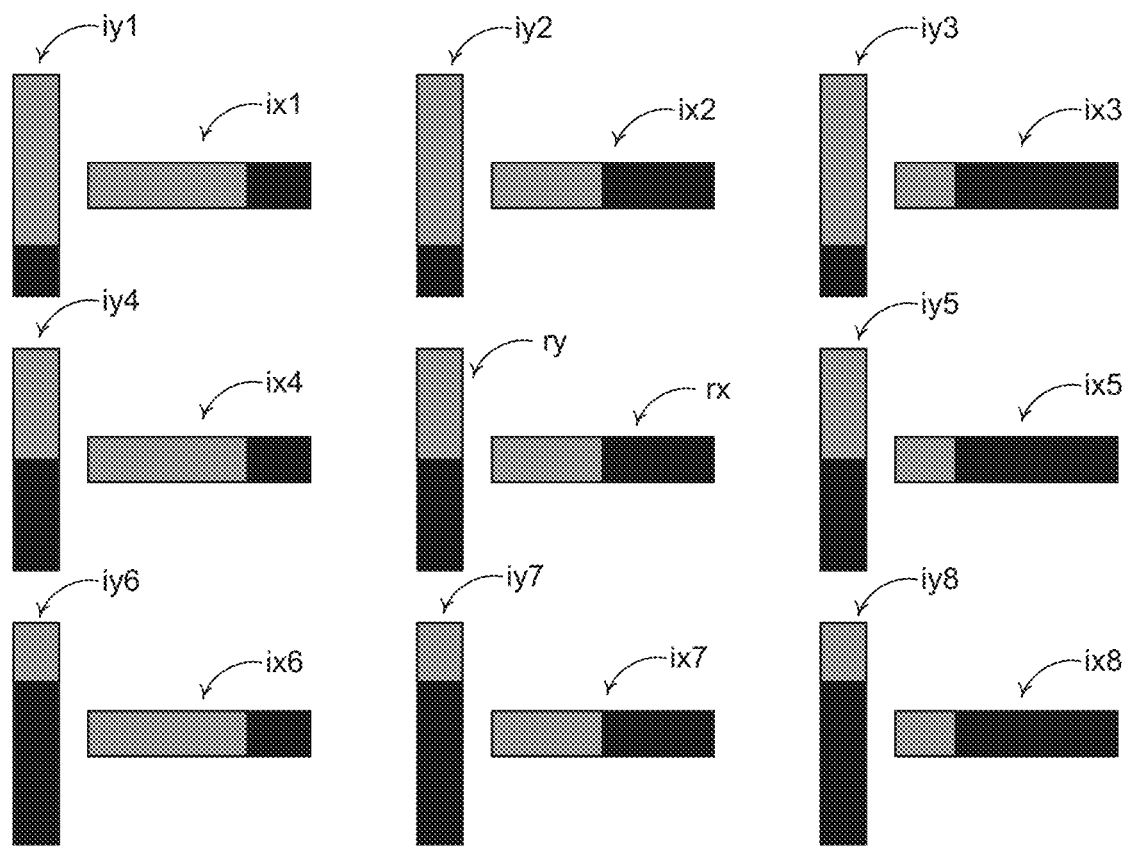
FIG. 9 shows an image of the base of components of FIG. 8B in a variety of displaced conditions.

FIG. 9 shows a plurality of captured images of each wheel 560, 562 or its target surface. Images rx, ry are images of each wheel 560, 562 or its target surface when the actuator 516 is in the neutral or center position and may be stored as a reference image or images. The images ix1 to ix8 are various images of wheel 560 or target surface captured when the actuator 516 is off axis or off center to various degrees in different directions on the x axis. The images iy1 to iy8 are various images of wheel 562 or target surface captured when the actuator 516 is off axis or off center to various degrees in different directions on the y axis.

The apparatus may comprise a switch 520, in the form of a microswitch or tactile switch. One of the gimbals may be mounted such that a sufficient vertical movement is available to activate the switch 520 when the actuator 516 is depressed towards the circuit board 514.

The apparatus 710 of FIGS. 13 and 14 is substantially similar in construction to the apparatus shown in FIG. 6, the ball 722 comprises a magnet M in the form of a permanent magnet. A magnetic sensor 731, which may take the form of a Hall effect sensor, is mounted to the circuit board 714. When the sensor 731 detects the presence, or absence, of a predefined magnetic field; the processor (not shown) determines that the actuator 716 is centered. For example, the processor may be configured to determine the actuator 716 is centered when the magnetic sensor 731 detects a magnetic field above a predefined threshold value. The processor may be configured with a calibration method, to set or define the threshold value when the actuator 716 is centered. The ball 722 is configured to limit movement to two orthogonal axes. The ball 722 is arranged to pivot or rotate about first and second axes x, y which are orthogonal to each other and are also orthogonal to the shaft axis zs.

The ball 722 comprises a pair of opposed cylindrical lug or projections 770 defining a rotation axis y aligned with a center of the ball 722. The ball 722 is mounted in a receiver 725a/725b. The receiver 725a/725b comprises upper and lower components 725a, 725b. The upper component provides the cup 724, and is illustrated as a transparent component for purposes of illustration. Together the upper and lower components 725a, 725b define an internal wall or surface which is generally spherical in shape. The internal wall comprises a pair of opposed recesses 772 each of which receives a respective one of the pair of opposed cylindrical lug or projections 770. The recesses 772 define channels extending about portions of the internal wall and allow the ball 722 to rotate about a second axis x. In alternative embodiments the pair or recesses may be replaced with a single recess extending about a portion of the internal wall of the receiver 725a/725b, the pair of recesses shown in FIG. 13 may be extending or joined together to form a single recess thereabout. The recesses 772 comprise end walls defining end stops E1, E2 limiting the angle or degree of rotation of the ball 722 about second axis x. The recesses or channel 772 is dimension to form a close fit about the cylindrical lugs 770 so as to prevent or minimize rotation of the ball about the shaft axis zs.

Figure 10:
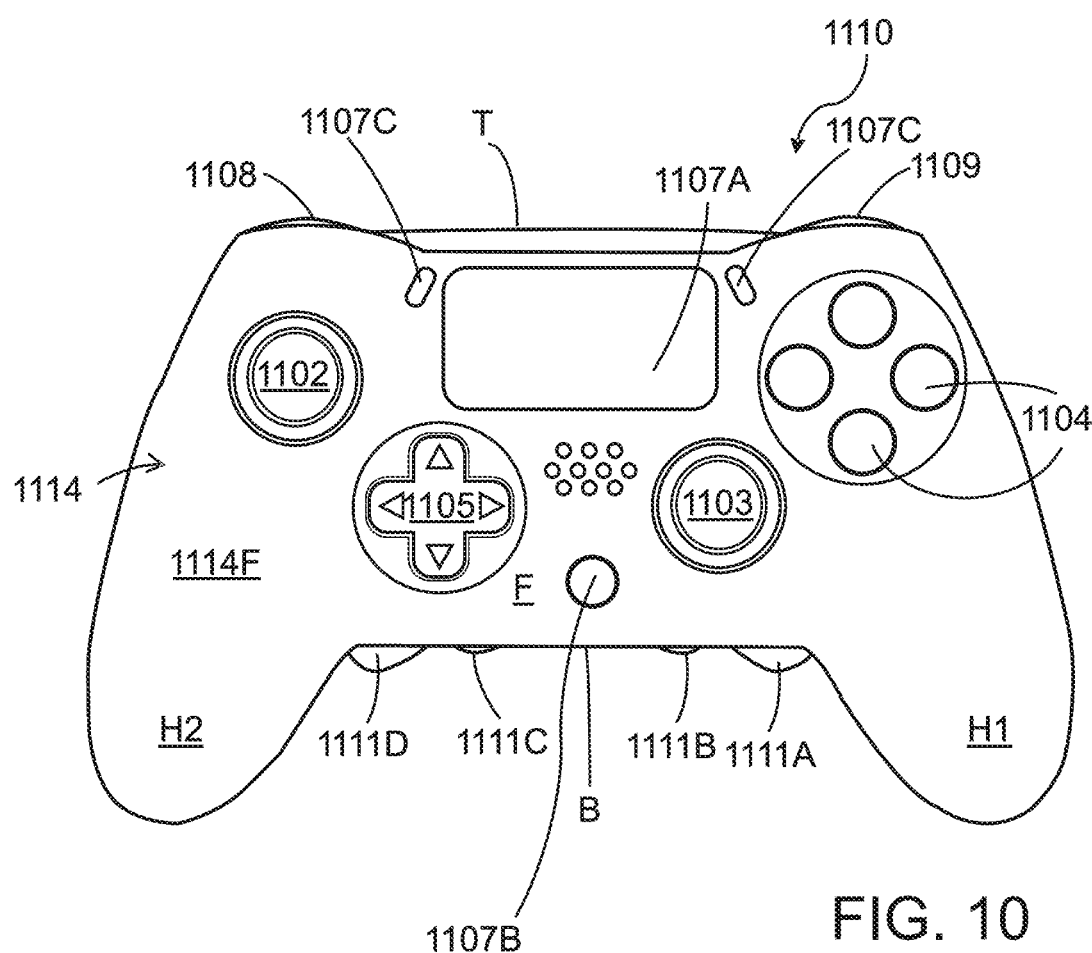
FIGS. 10-12 show a hand-held controller for a computer or game console in which an input device according to various embodiments of the present disclosure may be incorporated.
Figure 11:
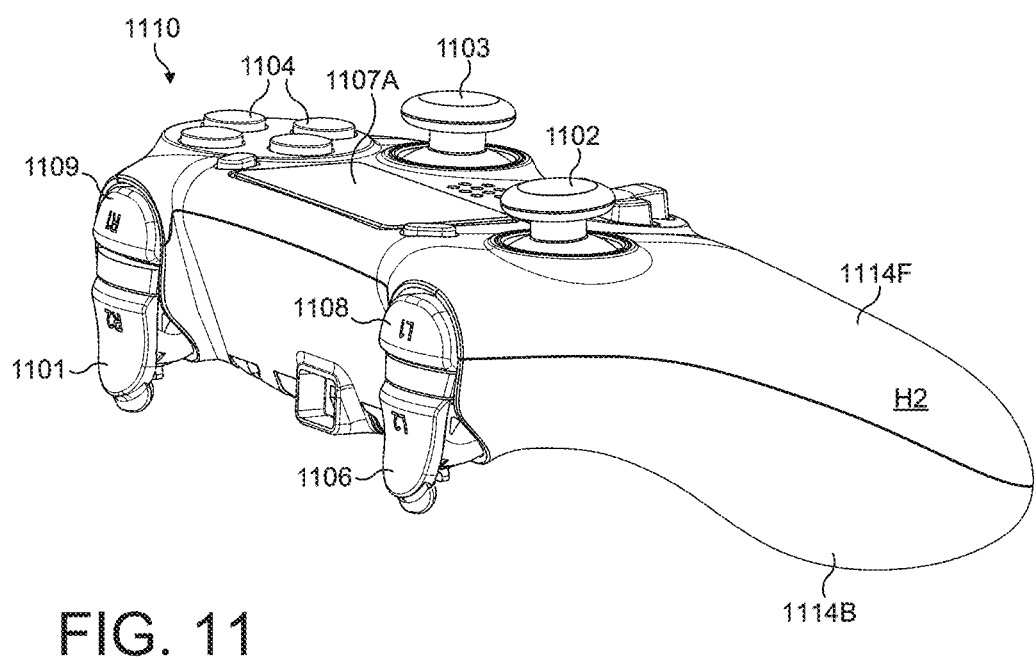
Figure 12:
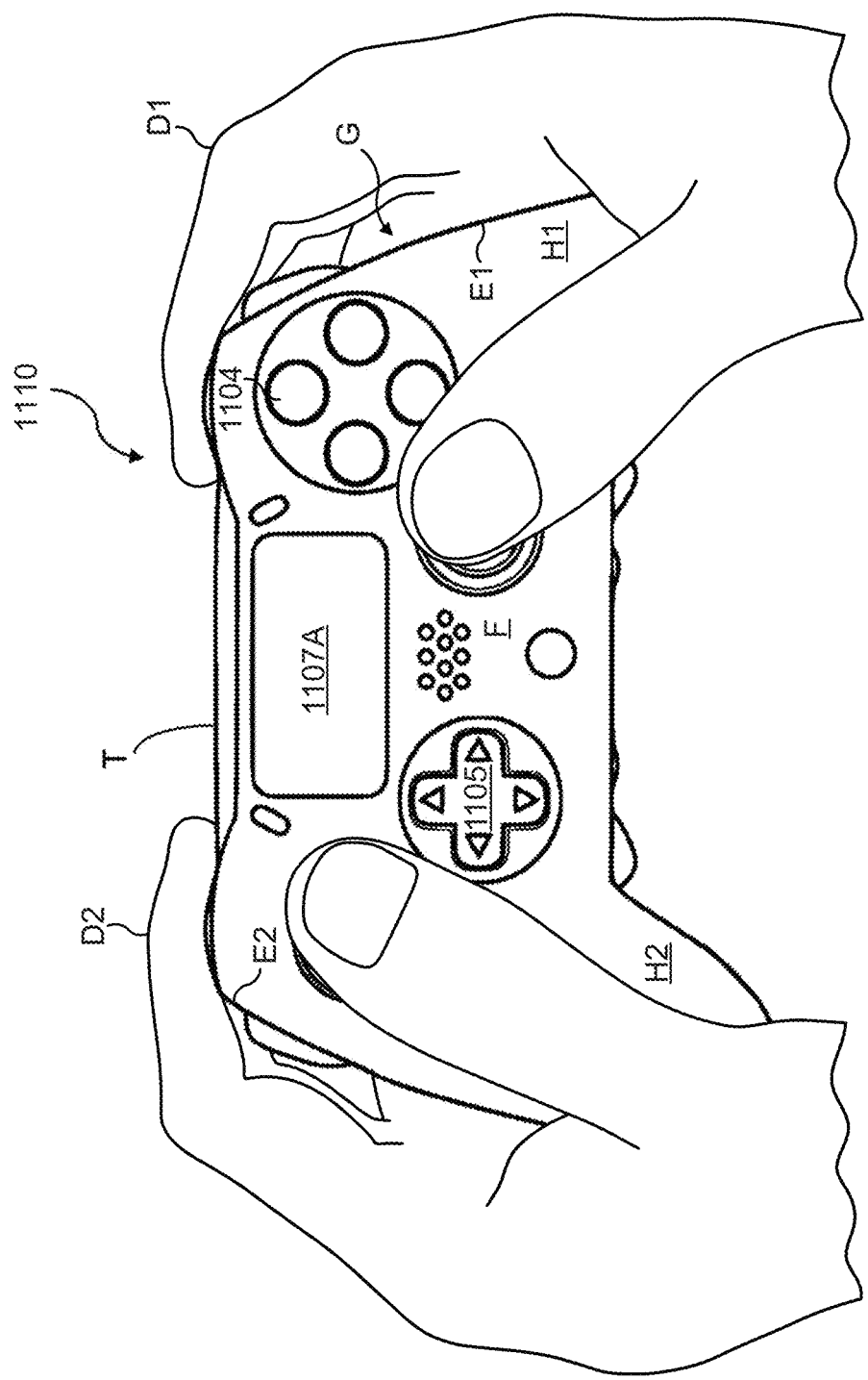

Referring to FIGS. 10 to 12 there is shown an input apparatus 1110 for a use with a computer. The input apparatus 1110 illustrated takes the form of a controller 1110 or game pad 1110 for use with a video games console, personal computer, laptop computer or similar. In other embodiments, the input apparatus 110 may take the form of a handheld games console or other mobile device such as but not limited to a smartphone, tablet computer, phablet or the input apparatus 1110 may be an accessory device (such as, but not limited to, a sleeve or case) for use with such a mobile device.

The apparatus or controller 1110 comprises an outer case or shell 1114. The case 114 (also referred to herein as housing 1114) may comprise one or more panels fitted together and or mounted to a chassis member. The case 1114 may comprise a front body panel 1114F and a rear body panel 1114B (see FIG. 11). The outer case 1114 comprises a void in which electronic components (such as, but not limited to, switches and/or sensors) are located. FIG. 12 shows an alternative view of the apparatus 1110 in the hands of a user.

The apparatus or controller 1110 comprises a plurality of controls which are mounted to the front F and to the top T of the apparatus 1110. As used herein the term "front" refers to an upper surface of the apparatus 1110 when in normal use held in both hands, whilst the term "top" refers to a leading edge of the apparatus 1110 which typically faces away from a user when held in both hands. A rear or back of the controller opposes the "front" and typically will form a lower surface, whilst the term "bottom" B refers to a trailing edge of the apparatus 1110 which typically faces towards the user when held in both hands. The apparatus 1110 comprises a plurality of buttons or actuators which, when activated, initiate a specific action or control function. The apparatus 110 comprises at least one omnidirectional control stick or button which is operable to provide directional input.

Specifically, in the illustrated example shown, the apparatus 1110 comprises first, left, and second, right, analogue control sticks, also known as thumb sticks 1102, 1103. These analogue control sticks may employ the component 10; 110, 210; 310; 410; 510 described above and/or illustrated in FIGS. 1 to 9. The first left 1102 and second right 1103 thumb sticks normally control movement and are intended to be operated by the user's left and right thumbs, respectively. Left and right thumb sticks 1102, 1103 are mounted to the front face F of the apparatus 1110. The left thumb stick 1102 is located in a forward (or upper i.e., nearer the top T of the apparatus 1110) left region of the front face F; and right thumb stick 1103 is located in a rearward (or lower i.e., nearer the bottom B of the apparatus 1110) right region of the front face F. There are four buttons 1104, located on a forward (or upper i.e., nearer the top T of the apparatus 110) right portion of the front face F of the apparatus 1110. The four buttons 1104 normally control additional actions and are intended to be operated by the user's right thumb. There is a direction pad 1105 located on the rearward (or lower) left portion of the front face F of the apparatus 1110. The direction pad 1105 is intended to be operated by the user's left thumb, typically either as an alternative to the left thumb stick 1102 or to provide additional action controls. In an embodiment, the positions of direction pad 1105 and left thumb stick 1102 may be reversed.

A left shoulder button or bumper 1108 and a right shoulder button or bumper 1109 are located on the top face T of the apparatus 1110. A left trigger 1106 and a right trigger 1101 are also located on the top face T of the controller 1110 (see FIG. 1B). The left and right triggers 1106, 1101 are typically operated by a user's index fingers. The left and right bumpers 1108, 1109 may also be operated by a user's index fingers. The left and right triggers 1106, 1101 may be analogue in nature, or may comprise a plurality of discrete digital states, that is to say the input control may be dependent upon the degree of depression or displacement of the trigger body.

The apparatus 110 may comprise one or more additional input buttons 1107A, 1107B, 1107C, the buttons 1107A, 1107B, 1107C may take the form of one or more digital or analogue buttons, or may be in the form of a touch pad or touch screen.

In order to operate any of the buttons 1104 a user will normally remove their right thumb from the right thumb stick 1103 so as to depress one or more of the buttons 1104. Switching between the right thumb stick 1103 and the buttons 1104 takes time since the user's thumb must traverse the distance therebetween. This may also cause a loss of, or reduction in, control in some games because the user has to relinquish control over the right thumb stick 1103 in order to control the buttons 1104. This may be a particular problem in games where the right thumb stick 1103 is used for aiming. A similar problem may arise in games where the direction pad 1105 provides additional actions and the user has to remove their left thumb from the left thumb stick 1102 in order to operate the direction pad 1105.

The apparatus 1110 comprises at least one handle H1, H2. The apparatus 1110 comprises two handles H1, H2 disposed on opposing sides of an intermediate body portion.

The apparatus 1110 may comprise at least one actuator or additional control 1111A, 1111B, 1111C, 1111D mounted to, or located in or upon the rear or back of the apparatus 1110, where the rear or back face is opposite the front face F (the face F to which the buttons 104, left and right thumb sticks 102, 103 and direction pad 105 are mounted).

The additional input controls 1111A, 1111B, 1111C, 1111D may be mounted on the rear face of the intermediate body portion, on the inner walls of the handles H1, H2 or alternatively on both the rear face of the intermediate body portion and the inner walls of the handles H1, H2. The additional input controls 1111A, 1111B, 1111C, 1111D are configured to activate a switch or sensor disposed internally thereof. The switch or sensor may be mounted internally, at least in part, of the housing 1114.

The user may operate the additional input controls 1111A, 1111B, 1111C, 1111D with a grip finger, that is to say a finger employed to grasp one of the handles H1, H2; typically, the middle, ring and little fingers. Although it is envisaged that the index finger could be employed to actuate the additional input controls 1111A, 1111B, 1111C, 1111D.

The present disclosure provides an analogue control stick for an input apparatus or game controller. The analogue control stick comprising a shaft pivotally mounted for movement about at least two orthogonal axes (two of said axes may be normal to a longitudinal axis of the shaft), the shaft having a target surface disposed at a proximal end, at least one light source, such as a light emitting diode or laser. A sensor which may take the form of a photodiode array, CMOS sensor, CCD image sensor, or other suitable photodetector, is provided to capture images of the target surface illuminated by the light source. The sensor configured to capture images at a polling interval. Wherein a processing unit compares, using digital image correlation, a current image of the target surface with the previous or last, immediately preceding, image of the target surface captured by the sensor to determine magnitude and direction of an incremental movement of the target surface between the compared images. The processing unit accumulates data, in a cache or memory, indicative of the incremental movements to calculate an absolute position of the target surface relative to a predefined or origin position. The analogue control stick may comprise an origin position detection system for determining return of the target surface to the predefined or origin position. The processing unit being configured upon detection of the target surface to the predefined or origin position clears the cache of accumulated incremental movement data.

The analogue control stick may comprise an origin, rest or neutral position in which the longitudinal axis is perpendicular to two of the at least two orthogonal axes about which the shaft is pivotally moveable. The analogue control stick may be biased to return to the origin, rest or neutral position absent an external influence.

The present disclosure also provides a method of tracking movement of an analogue control stick of an input device or game controller. The method comprises illuminating a target surface of the analogue control stick with light and capturing images of the target surface with an image sensor at a predefined polling interval. The method comprises comparing, using digital image correlation, a current image of the target surface with the previous or last, immediately preceding, image of the target surface captured by the sensor to determine magnitude and direction of an incremental movement of the target surface between the compared images.

The method comprises accumulating data, in a store, cache or memory, indicative of the incremental movements to calculate an absolute position of the target surface relative to a predefined or origin position. The method comprises detecting return of the target surface to the predefined or origin position, upon detection of the target surface returning to the predefined or origin position clearing the store of accumulated incremental movement data.

In some embodiments, detecting return of the target surface to the predefined or origin position may comprise comparing, using digital image correlation, a current image of the target surface with a reference image of the target surface captured by the sensor when the target surface was in a predefined, origin or reference position.

The target surface may comprise a predefined pattern or image printed or otherwise mounted thereon. The pattern or image may comprise contrasting features or shapes to define one or more reference edges or points which are readily detected by an image sensor. The pattern or image may have a rotational symmetry about the longitudinal axis of the shaft; the order of the symmetry may be infinite.

In some embodiments, detecting return of the target surface to the predefined or origin position may comprise detecting an electrical characteristic indicative of the target surface being disposed the predefined or origin position. The electrical characteristic may be the resistance of an element in an electric circuit, the voltage across it or the current flowing through it.

Detecting an electrical characteristic may comprise completing an electric circuit, to close the circuit or allow current flow in the circuit.

Detecting an electrical characteristic may comprise sensing a magnetic field having a magnitude above a threshold value.

The light source may be a source of visible light or other electromagnetic radiation such as infra-red or ultraviolet. The light source may be a source of coherent light such as a laser and may take the form of a laser diode.

It can be appreciated that various changes may be made within the scope of the present invention. For example, the size and shape of the components may be adjusted to accommodate controllers of differing size or shape. Whilst in the foregoing embodiments the apparatus is mounted to a game controller in other embodiments the apparatus may be mounted to an alternative device in which it is desired to provide an analogue directional input.

It will be recognized that as used herein, directional references such as "top", "bottom", "front", "back", "end", "side", "inner", "outer", "upper" and "lower" do not limit the respective features to such orientation, but merely serve to distinguish these features from one another.

What is claimed is:

1. An analogue control for an input apparatus, the analogue control comprising:
  a shaft pivotally mounted for movement about at least two orthogonal axes arranged normal to a longitudinal axis of the shaft and about a third orthogonal axis parallel to the longitudinal axis of the shaft;
  a target surface disposed at a proximal end of the shaft;
  at least one light source;
  a first sensor for capturing images, at a polling interval, of the target surface illuminated by the light source when the shaft is moved in one or more of the two orthogonal axes normal to the longitudinal axis of the shaft;
  a processing unit configured to:
    compare a current image of the target surface with the immediately preceding image of the target surface captured by the sensor to determine magnitude and direction of any incremental movement of the target surface relative to the sensor between the compared images,
    accumulate data, in a memory cache, indicative of the incremental movements to calculate an absolute position of the target surface relative to a predefined or origin position;
  a second sensor configured to capture an input when the shaft is moved along the third orthogonal axis parallel to the longitudinal axis of the shaft; and
  an origin position detection system for determining return of the target surface to a predefined origin position,
  wherein the processing unit is configured to clear the cache of accumulated incremental movement data upon detection of the target surface being disposed at the predefined origin position.

2. The analogue control of claim 1, wherein the origin position detection system is configured to determine the orientation of the target surface relative to the first sensor and compare with the orientation of the target surface relative to the first sensor when disposed in the predefined origin position.

3. The analogue control of claim 1, wherein the origin position detection system comprises a captured reference image of the target surface disposed in the predefined origin position and wherein the processing unit is configured to compare, using digital image correlation, the captured reference image with a current image of the target surface.

4. The analogue control of claim 3, wherein the origin position detection system comprises a predefined pattern provided upon the target surface.

5. The analogue control of claim 4, wherein the pattern comprises contrasting features to define one or more reference points which are readily detected by the sensor.

6. The analogue control of claim 5, wherein the pattern comprises a rotational symmetry about the longitudinal axis of the shaft.

7. The analogue control of claim 1, wherein the origin position detection system comprises a third electrical sensor for detecting an electrical characteristic indicative of the target surface being disposed the predefined origin position.

8. The analogue control of claim 7, wherein the origin position detection system comprises a pair of electrical contacts and a conductor arranged to connect the pair of electrical contacts when the target surface is disposed in the predefined origin position.

9. The analogue control of claim 7, wherein the electrical characteristic is a magnetic field and the third electrical sensor is a magnetic sensor.

10. The analogue control of claim 1, wherein the second sensor comprises a switch.

11. The analogue control of claim 10, further comprising a limb in mechanical communication with the shaft, such that when the shaft is moved along the third orthogonal axis, the limb correspondingly moves to activate the switch.

12. The analogue control of claim 1, wherein the first sensor is a photodetector selected from the following group: a photodiode array, a CMOS sensor, and a CCD image sensor.

13. The analogue control of claim 1, wherein the processing unit employs digital image correlation to compare two images of the target surface.

14. The analogue control of claim 1, wherein the shaft is biased to return to the predefined origin position and wherein in the predefined origin position the shaft is in a neutral unbiased condition.

15. The analogue control of claim 1, wherein the shaft comprises a ball at the proximal end, the ball providing the target surface and being mounted in a receiver, the receiver comprises an internal wall shaped complementary to the ball, the receiver comprising an opening through which the shaft extends, the opening being flared to define a cup and wherein the shaft comprise a cone slideable mounted thereon, the cone being resiliently biased towards the cup.

16. The analogue control of claim 15, wherein the ball and receiver are keyed to limit rotation to two orthogonal axes both of which are arranged normal to a longitudinal axis of the shaft, one of the ball and receiver comprising at least one key and the other one of the ball and receiver comprising a keyseat.

17. The analogue control of claim 1, wherein in the predefined origin position the target surface is centered in its available range of motion.

18. A method of tracking movement of an analogue control stick of an input device or game controller, the method comprising:

illuminating a target surface of the analogue control stick with light;

capturing images of the target surface when a shaft of the control stick is moved in one or both of two orthogonal axes arranged normal to a longitudinal axis of the shaft with an image sensor at a predefined polling interval;

comparing, using digital image correlation, a current image of the target surface with the immediately preceding image of the target surface captured by the image sensor to determine magnitude and direction of an incremental movement of the target surface between the compared images;

accumulating data, in a memory cache, indicative of the incremental movements to calculate an absolute position of the target surface relative to a predefined origin position;

detecting return of the target surface to the predefined origin position, wherein upon detection of the target surface returning to the predefined origin position the method comprises clearing the stored accumulated incremental movement data; and capturing an input with a second sensor when the shaft of the control stick is moved along a third orthogonal axis parallel to the longitudinal axis of the shaft.

19. The method of claim 18, wherein detecting return of the target surface to the predefined origin position comprise comparing, using digital image correlation, a current image of the target surface with a reference image of the target surface captured by the image sensor when the target surface was in a predefined, origin or reference position.

20. The method of claim 18, wherein the target surface may comprise a predefined pattern having contrasting features defining one or more reference points and comparing the current image of the target surface with the reference image comprises matching said one or more reference points.

* * * * *